(12) United States Patent
Chamberlain et al.

(10) Patent No.: US 6,928,030 B2
(45) Date of Patent: Aug. 9, 2005

(54) SEISMIC DEFENSE SYSTEM

(75) Inventors: Donald G. Chamberlain, Calgary (CA); Jerald L. Harmon, Sugar Land, TX (US); William T. Bell, Huntsville, TX (US)

(73) Assignee: Geo-X Systems, Ltd., Calgary (CA)

( * ) Notice: Subject to any disclaimer, the term of this patent is extended or adjusted under 35 U.S.C. 154(b) by 27 days.

(21) Appl. No.: 10/652,669

(22) Filed: Aug. 30, 2003

(65) Prior Publication Data

US 2005/0047277 A1 Mar. 3, 2005

(51) Int. Cl.$^7$ ................................................ H04B 1/06
(52) U.S. Cl. ...................................................... 367/136
(58) Field of Search ................................ 367/134, 135, 367/136, 137; 102/221

(56) References Cited

U.S. PATENT DOCUMENTS

| 4,009,523 A | 3/1977 | Van Hook |
| 4,110,730 A | 8/1978 | Varecka et al. |
| 4,189,999 A | 2/1980 | Anderson |
| 4,398,466 A | 8/1983 | Sepp et al. |
| 4,402,271 A | 9/1983 | Heidmann et al. |
| 4,712,479 A | 12/1987 | Babel |
| 5,125,317 A | 6/1992 | Spektor et al. |
| H1123 H | 12/1992 | Eickerman et al. |
| 5,416,906 A | 5/1995 | Mariani |
| 5,497,705 A | 3/1996 | Bredy et al. |
| 6,253,679 B1 | 7/2001 | Woodall et al. |
| 6,363,854 B1 | 4/2002 | Schweitzer |
| 6,484,617 B1 | 11/2002 | Anderson et al. |
| 6,487,952 B1 | 12/2002 | Borgwarth et al. |
| 2002/0170419 A1 | 11/2002 | Borgwarth et al. |

FOREIGN PATENT DOCUMENTS

| GB | 2029618 A | * | 3/1980 | ........... F42B/23/26 |
| GB | 2 057 733 A | | 4/1981 | |

* cited by examiner

*Primary Examiner*—Daniel Pihulic
(74) *Attorney, Agent, or Firm*—W. Allen Marcontell

(57) ABSTRACT

A set of seismic detectors is distributed throughout a defense zone in communication with a set of attack or other controllable devices. A seismic signal source controlled by a zone defense coordinator communicates at scheduled times to the seismic detectors and through them to the associated devices to convey mission critical information. The seismic detectors and the attack devices are controlled singularly and/or collectively by self-contained processors. The seismic source may be at a fixed site and is substantially repeatable as well as controllable. The system may be specially adapted to a wide range of terrains including land and water; and from very shallow to very deep water. Targets may be characterized in terms of their typical seismic signatures and the same hardware system used for seismic communication may be also programmed for target detection and device activation.

46 Claims, 21 Drawing Sheets

TABLE 1
PROJECT MENU EXAMPLE

Project Fixed Parameters

| Parameter Name | Symbol | Source | General Default | Allowed Values | Units | | | | | | | | | |
|---|---|---|---|---|---|---|---|---|---|---|---|---|---|---|
| Project Name | PN | Project File | Project Unidentified | | alphanumeric | | | | | | | | | |
| SISS Unit Time Step | UTS | Project File | 0.200 | 0.005 to 0.500 in steps of 0.005 | seconds | | | | | | | | | |
| Listen Time | LT | Project File | 12.000 | 0.500 to 25.000 in steps of 0.500 | seconds | | | | | | | | | |
| Buffer Time | BT | Project File | 8.000 | 0.500 to 25.000 in steps of 0.500 | seconds | | | | | | | | | |
| PTW Interval | ZPTW | Project File | 15 minutes | 5 to 60 minutes | minutes | | | | | | | | | |
| Start Time of First PTW | sPTW | Project File | | | | | | | | | | | | |
| Sweep Length | RL | Project File | 9.000 | 0.5 to 36.0 Seconds | seconds | | | | | | | | | |
| Sample Period | SP | Project File | 2 milliseconds | 50, 1, 2, 3, 4, 6 | milliseconds | | | | | | | | | |
| NDAU Model Number | | General Menu | 1.2 HX Model 2 | 16 characters | alphanumeric | | | | | | | | | |
| NSR Software Version | | Software | Version 2.0 | 16 characters | alphanumeric | | | | | | | | | |
| Military Command Identification | | Project File | Command Unidentified | 64 characters | alphanumeric | | | | | | | | | |
| Military Unit Identification | | Project File | Unit Unidentified | 64 characters | alphanumeric | | | | | | | | | |
| Receiver Types | RT | Project File | Receivers Unidentified | 64 characters | alphanumeric | | | | | | | | | |
| Source Types | | Project File | Source Unidentified | 16 characters | alphanumeric | | | | | | | | | |
| Auto Edit Shots On/Off | AEF | Project File | Perform Autoedit | 0 to 1 | alphanumeric | | | | | | | | | |
| Minimum Correlation Coeff. | MINCC | Project File | 0.7 | | none | | | | | | | | | |
| Gain Mode for SISS DP | GM | Project File | Constant Gain | 16 characters | alphanumeric | | | | | | | | | |
| Back Up Mode | BUM | Project File | General Default | 32 characters | alphanumeric | | | | | | | | | |
| Other General Parameters | | Project File | As defined | | | | | | | | | | | |

FIG.16

TABLE 2
PROJECT MENU EXAMPLE

VARIABLE COMMUNICATED PARAMETERS

| Parameter Name | Symbol | Source | General Default | Allowed Values | Units | Maximum Ordinal Count | Cum. Max. Ordinal Count | Earliest Shot Time | Latest Shot Time |
|---|---|---|---|---|---|---|---|---|---|
| Reference Shot | RSHOT | SISS Shot 0 | No Default Allowed | | | 1 | 1 | 0.000 | 0.000 |
| Menu ID for Next PTW | PMID | SISS Shot 1 | PM1 | up to 10 menus | alphanumeric | 10 | 11 | 20.000 | 21.800 |
| K Gain | K | SISS Shot 2 | 30 decibels | 24,30,36, 42 | decibels | 4 | 15 | 41.800 | 42.400 |
| Arm/Disarm Switch | ARMSW | SISS Shot 3-10 | DISARM | ARM or DISARM | binary switch | 1 | 16 | 62.400 | 62.400 |
| | | | | | | 1 | 17 | 82.400 | 82.400 |
| | | | | | | 1 | 18 | 102.400 | 102.400 |
| | | | | | | 1 | 19 | 122.400 | 122.400 |
| | | | | | | 1 | 20 | 142.400 | 142.400 |
| | | | | | | 1 | 21 | 162.400 | 162.400 |
| | | | | | | 1 | 22 | 182.400 | 182.400 |
| Detonate Command | DETCOM | SISS Shot 11-18 | Not Activated | DETONATE or NOT-DETONATE | binary switch | 1 | 23 | 202.400 | 202.400 |
| | | | | | | 1 | 24 | 222.400 | 222.400 |
| | | | | | | 1 | 25 | 242.400 | 242.400 |
| | | | | | | 1 | 26 | 262.400 | 262.400 |
| | | | | | | 1 | 27 | 282.400 | 282.400 |
| | | | | | | 1 | 28 | 302.400 | 302.400 |
| | | | | | | 1 | 29 | 322.400 | 322.400 |
| | | | | | | 1 | 30 | 342.400 | 342.400 |
| Parity | PAR | SISS Shot 19 | No default is available | # of shots (-1) in this PTW (3, 11 or 19) | Ordinal Integer | 1 | 31 | 362.400 | 362.400 |
| SISS Record Duration | RD | Computed for each case | | 398.000 | Seconds | 19 | 50 | 382.400 | 398.000 |

TABLE 4
SECOND EXAMPLE OF APPLICATION OF PROJECT MENU FROM TABLE 1

*Example of Message Transmission*

*Example of Reception and Decoding of Message*

| Setting | Interpretation | Chosen Ordinal | Corresponding Shot Time | Observed Corr. Coeff. | Shot? | Weighted Corr. Coeff. | Observed Raw Times | Nearest Time In Model | Delta to Model Times | Corrected Times | Delta to Model Times | Ordinal Calculation | Settings Calculation | Interpreted Settings |
|---|---|---|---|---|---|---|---|---|---|---|---|---|---|---|
| PM 1 | Project Menu 1 | 1 | 0.000 | 0.850 | 1 | 0.85 | -0.002 | 0.000 | -0.002 | -0.001 | -0.001 | 1 | NA | Project Menu 1 |
| 42 decibels | K Gain is 42 db | 2 | 20.200 | 0.821 | 1 | 0.821 | 20.204 | 20.200 | 0.004 | 20.205 | 0.005 | 2 | PM2 | K Gain is 42 db |
| ARM | ARM THE DETONATOR | 4 | 42.400 | 0.789 | 1 | 0.789 | 42.395 | 42.400 | -0.005 | 42.396 | -0.004 | 4 | 42 decibels | ARM THE DETONATOR |
| | (all live shots) | 1 | 62.400 | 0.798 | 1 | 0.798 | 62.403 | 62.400 | 0.003 | 62.404 | 0.004 | 1 | shot | the detonator will be armed |
| | | 1 | 82.400 | 0.912 | 1 | 0.912 | 82.395 | 82.400 | -0.005 | 82.396 | -0.004 | 1 | shot | |
| | | 1 | 102.400 | 0.898 | 1 | 0.898 | 102.405 | 102.400 | 0.005 | 102.406 | 0.006 | 1 | shot | |
| | | 1 | 122.400 | 0.855 | 1 | 0.855 | 122.399 | 122.400 | -0.001 | 122.400 | 0.000 | 1 | shot | |
| | | 1 | 142.400 | 0.789 | 1 | 0.789 | 142.396 | 142.400 | -0.004 | 142.397 | -0.003 | 1 | shot | |
| | | 1 | 162.400 | 0.912 | 1 | 0.912 | 162.398 | 162.400 | -0.002 | 162.399 | -0.001 | 1 | shot | |
| | | 1 | 182.400 | 0.715 | 1 | 0.715 | 182.403 | 182.400 | 0.003 | 182.404 | 0.004 | 1 | shot | |
| | | 1 | 202.400 | 0.912 | 1 | 0.912 | 202.392 | 202.400 | -0.008 | 202.393 | -0.007 | 1 | shot | |
| DETONATE | DETONATE | 1 | 222.400 | 0.844 | 1 | 0.844 | 222.401 | 222.400 | 0.001 | 222.402 | 0.002 | 1 | shot | DETONATE |
| | (all live shots) | 1 | 242.400 | 0.852 | 1 | 0.852 | 242.398 | 242.400 | -0.002 | 242.399 | -0.001 | 1 | shot | the detonation will occur immediately |
| | | 1 | 262.400 | 0.952 | 1 | 0.952 | 262.399 | 262.400 | -0.001 | 262.400 | 0.000 | 1 | shot | |
| | | 1 | 282.400 | 0.917 | 1 | 0.917 | 282.391 | 282.400 | -0.009 | 282.392 | -0.008 | 1 | shot | |
| | | 1 | 302.400 | 0.895 | 1 | 0.895 | 302.405 | 302.400 | 0.005 | 302.406 | 0.006 | 1 | shot | |
| | | 1 | 322.400 | 0.888 | 1 | 0.888 | 322.401 | 322.400 | 0.001 | 322.402 | 0.002 | 1 | shot | |
| | | 1 | 342.400 | 0.884 | 1 | 0.884 | 342.396 | 342.400 | -0.004 | 342.397 | -0.003 | 1 | shot | |
| | | 1 | 362.400 | 0.953 | 1 | 0.953 | 362.402 | 362.400 | 0.002 | 362.403 | 0.003 | 1 | shot | |
| | | 1 | 386.000 | 0.924 | 1 | 0.924 | 385.997 | 386.000 | -0.003 | 385.998 | -0.002 | 1 | shot | |
| PARITY | 19 shots not incl. this shot | 19 | | | | | | | | | | 19 | Parity | Parity Checks OK |
| | | | | | 20 Shots Found | 0.8688 Average Corr. Coeff. | | | Avg Delta -1.0 msec | 0.00410333 | 4.10 msec | Parity Checks OK | | Std. Deviation is OK |
| | | | | | | | | | DAU Time Drift Est. | | Std. Deviation is OK | | | Avg. Corr. Coeff. is .87 |
| | | | | | | | | | Clock is 1.0 msec slow | | | | | Shots are consistent |
| | | | | | | | | | | | | | | Quality Standards Met |

FIG. 19

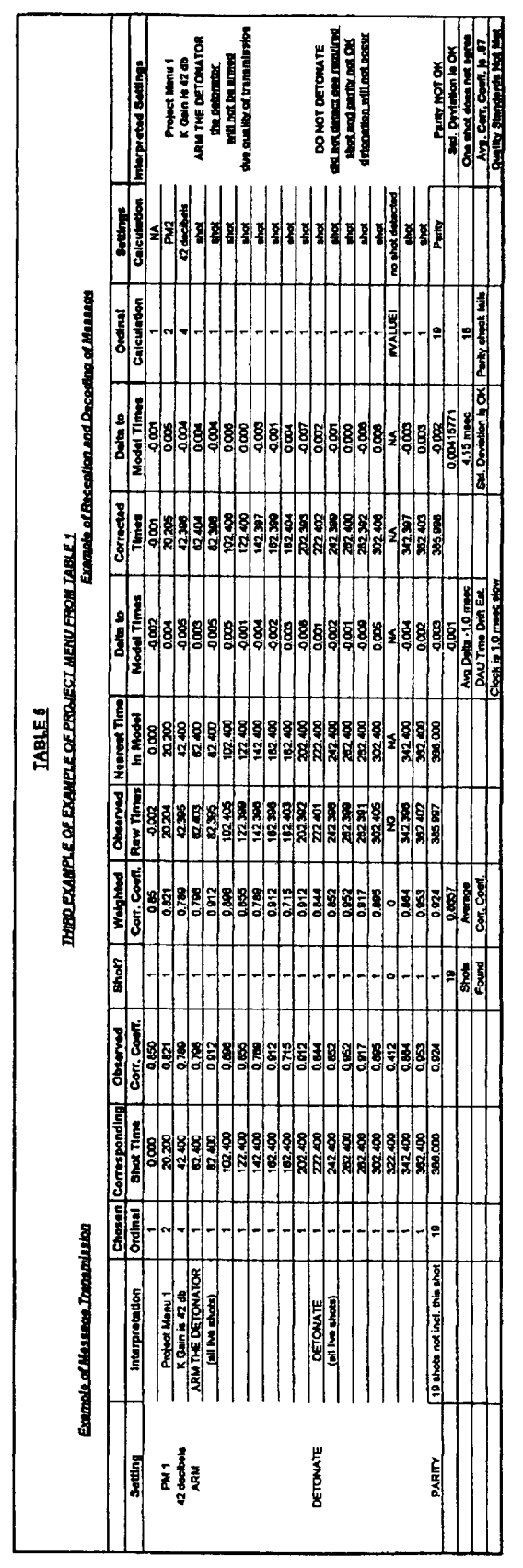

TABLE 5
THIRD EXAMPLE OF EXAMPLE OF PROJECT MENU FROM TABLE 1

SEISMIC DEFENSE SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

In a military defense of a geographic zone, it is known to utilize explosive mines, and other pre-positioned ordnance, to automatically attack enemy intruders without human direction. It is also known to use pre-positioned sensors, lights, alarms and other devices to perform additional defensive actions such as enemy detection and illumination. After the defensive devices are geographically deployed, it is desirable to be able to communicate information from a nearby or more remote location to the devices and to selectively control their status or actions. Electromagnetic waves may be used for such communication but may be limited by problems of communication security and requirements for specialized receivers at each of the devices. Seismic waves or acoustic waves have also been proposed as a means of such communication for both on and offshore mines, as in U.S. Pat. No. 5,125,317 by Moshe Spektor et al and U.S. Patent Application Publication No. 2002/0170419. However, the approaches so far described have been limited in versatility, distance of communication and reliability. One significant limitation of such prior art seismic communication methods is that only a very limited range of information, actions or commands may be communicated.

SUMMARY OF THE INVENTION

An objective of the present invention is provision of a secure, reliable and information-rich seismic method of communicating with military ordnance devices such as mines in a battlefield environment or defense zone. The system includes a seismic sensor associated with each defense zone device. The seismic sensor may be an integral part of an ordnance device or it may be physically separated and connected by a wire or other communication link to the device. A seismic source at a fixed site relative to the defense zone transmits information to the defense zone devices by the generation of a series of nearly identical seismic shots at selected times. A data processor in communication with a seismic sensor deciphers the seismic source information based primarily on time interval measurements; the time intervals being relative to the timing of a reference shot. The data processors further control the operation of the ordnance devices as directed by the seismic source information. In addition, the data processors may be programmed to process the ambient wave field for target identification, such as described in U.S. Pat. Nos. 4,110,730 and 4,009,523. One preferred ordnance device encompassed by the invention includes a mine with explosive charges that are armed, disarmed or detonated in response to the transmitted information.

The fixed-site seismic source may be monitored for correct performance by an independent seismic receiver array in the defense zone vicinity, using technology available in the petroleum industry. This seismic receiver array can be extended and also be employed by a zone control computer to serve another important purpose; as a seismic intrusion detector. Further, a zone control computer may determine from the array data whether mine detonations have occurred within the defended zone and the approximate location of the detonations.

For monitoring purposes, the receiver array 13 is preferably calibrated beforehand by using the seismic source at various locations within defense zone, again using technology familiar to those practicing seismic exploration for petroleum. Time intervals between seismic shots may be measured by cross-correlating a first seismic shot recording with a second seismic shot recording, and then translated by use of a project menu correlating the intervals to pre-selected instructions. A clock at the ordnance device may also have its clock drift accounted for by the measurement of these interval lengths.

The communication aspect of the invention also may be viewed as a method of transmitting information to any remote location on or in the earth or within associated bodies of water. This method includes the steps of generating a reference seismic signal, receiving the reference signal at a remote location, generating a second nearly identical seismic signal, and receiving the second signal at the remote location, and correlating information to the delay between the first and the second seismic signals. The delay is a predetermined interval that is timed by synchronized clocks. Information determinations are based on the delay or presence/absence of the second seismic signal. This information may be a coded command interpretable by reference to a stored project menu.

The methods of this invention share certain features with those disclosed by U.S. Pat. No. 6,002,640 and U.S. Pat. No. 6,584,406, both hereby incorporated by reference for all purposes.

BRIEF DESCRIPTION OF THE DRAWINGS

For a more detailed description of the preferred embodiment of the present invention, reference will now be made to the accompanying drawings and tables, wherein:

FIG. 14C is a graph of the actual first arrival time for seismic energy from the mine C detonation.

FIG. 16 presents Table 1 as a partial project menu example showing the project fixed parameters:

FIG. 17 presents Table 2 with the remainder of the project menu example, showing the variable communicated parameters:

FIG. 18 presents Table 3 as a first example of application of the project menu from Tables 1 and 2, in which the device is successfully commanded to arm (but not to detonate):

FIG. 19 presents Table 4 and a second example of application of project menu from Tables 1 and 2, in which the device is successfully commanded to arm and to detonate: and, FIG. 20 presents Table 5 as a third example of project menus applications from Tables 1 and 2, in which an attempt to communicate to the device is unsuccessful.

DETAILED DESCRIPTION OF THE PREFERRED EMBODIMENT

Figure 1:
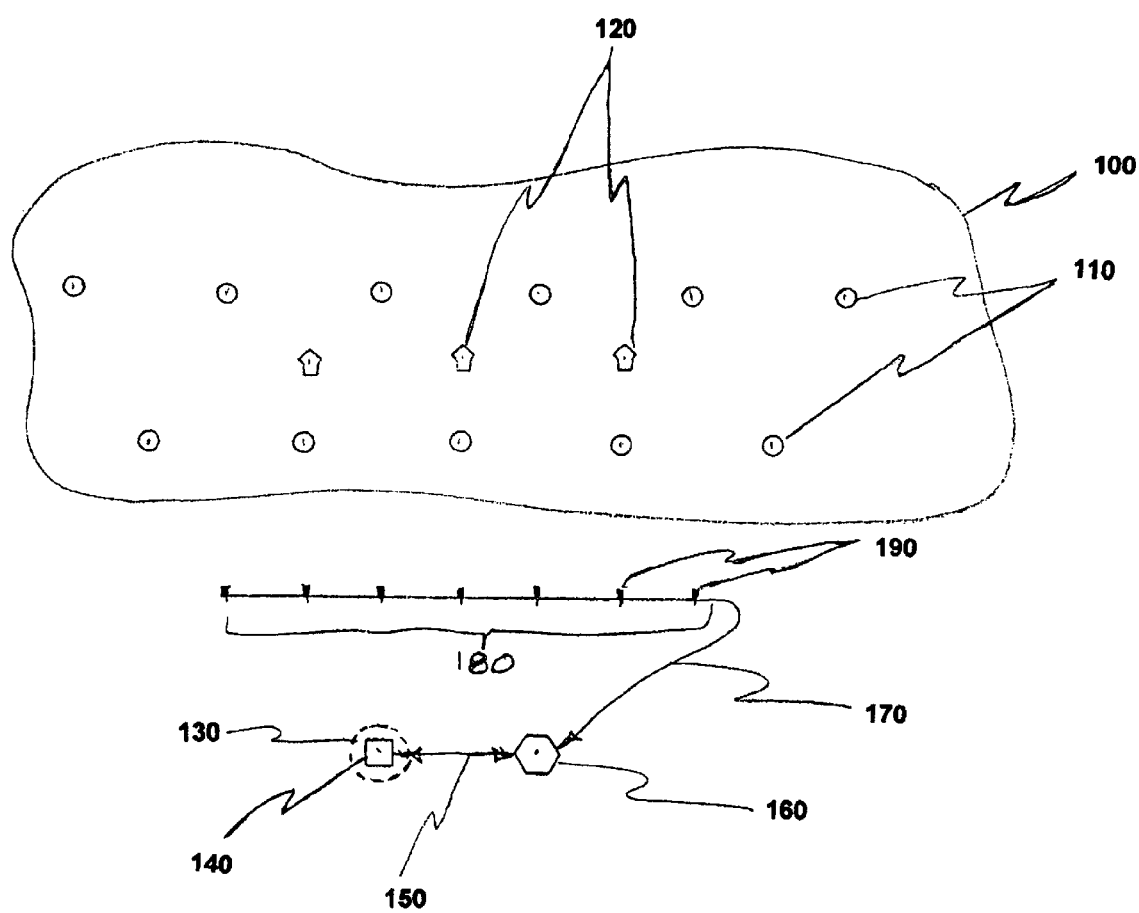
FIG. 1 is a map view of a defense zone showing the system components including attack devices, illumination devices, fixed-site seismic source, seismic receiver array and zone controller.

Referring to FIG. 12, a defense zone 100 is shown in map view. Military attack devices such as mines 110 and other controllable devices useful for defensive purposes such as illuminating devices 120 are distributed within the zone. At a secure fixed site 130 in relative proximity to, or within, the defense zone a seismic source 140 is deployed. The seismic source is connected by communication link 150 to the zone controller 160. The zone controller is further linked by a wired or wireless communication link 170 to a seismic receiver array 180. This array contains one or more seismic sensor units 190. The defense zone 100 may be dry land, water-covered to any depth or a combination of land and water.

The seismic source 140 must be a substantially repeatable seismic source and must be able to transmit a nearly identical seismic wave form, from a given fixed site, repeatedly in quick succession and over long periods of time, as long as the duration of the defense zone. As a suggested quantitative measure of repeatability, at the target location successive seismic signals should yield cross-correlation coefficients of 0.7 or higher and cross-correlation peaks should vary by less than 5 milliseconds (msec) for successive shots. The source unit should be able to activate within 2 msec of the scheduled time. Vibroseis sources, as commonly used in the petroleum industry, generate a swept-frequency continuous source wavelet and are generally able to meet these requirements; they are suitable for the present purpose. Certain mechanical seismic source types that generate short duration impulsive source wavelet, including air guns and weight drop sources, are also suitable. Explosive sources are generally not suitable both because of repeatability failure and inability to fire in quick succession. A further negative for explosive sources is that they are readily detectable by the intruders, even at great distance, whereas the preferred sources are not, except at short distance.

For longer distance seismic communication multiple source units may be utilized, either from one fixed site or from multiple fixed sites, but are controlled by only one zone controller. The multiple source units are activated simultaneously to increase the signal strength. According to the method of the invention it is not required that the sources emit the same wave form, only that each source emits a nearly identical wave form each time it is activated.

A key advantage of a fixed-site source as opposed to a moving source is that much greater range of communication may be reliably achieved. If shorter range seismic communication is satisfactory to the practitioner, the site can be moved, but must remain in proximity to the devices. A frequency-keyed or shot-interval keyed communication scheme may be utilized rather than the fixed-site time-interval method described in detail as the preferred embodiment. For example a Vibroseis source could use a series of pre-defined swept frequency signals to convey various information and commands to the devices. U.S. Pat. No. 4,879,696 describes such a method using phase-encoded Vibroseis sources to control remote distributed seismic data acquisition devices. As another example, a moving airgun source vessel could shoot a series of shots, with pre-defined short intervals between the shots, to convey information and commands to submerged devices.

A 'seismic shot' is defined as the deliberate creation of seismic energy by a controlled seismic source at a source location on or in the earth. In this document the term 'shot' is used interchangeable with 'seismic shot'. The term 'shot' is also used to refer to the manifestation of that seismic energy as may be received and recorded at various locations away from the site of origin. For example a 'shot' may mean the received and digitized wave energy of the seismic shot as in 'the shot was processed by cross-correlating with the prior shot'.

Figure 2:
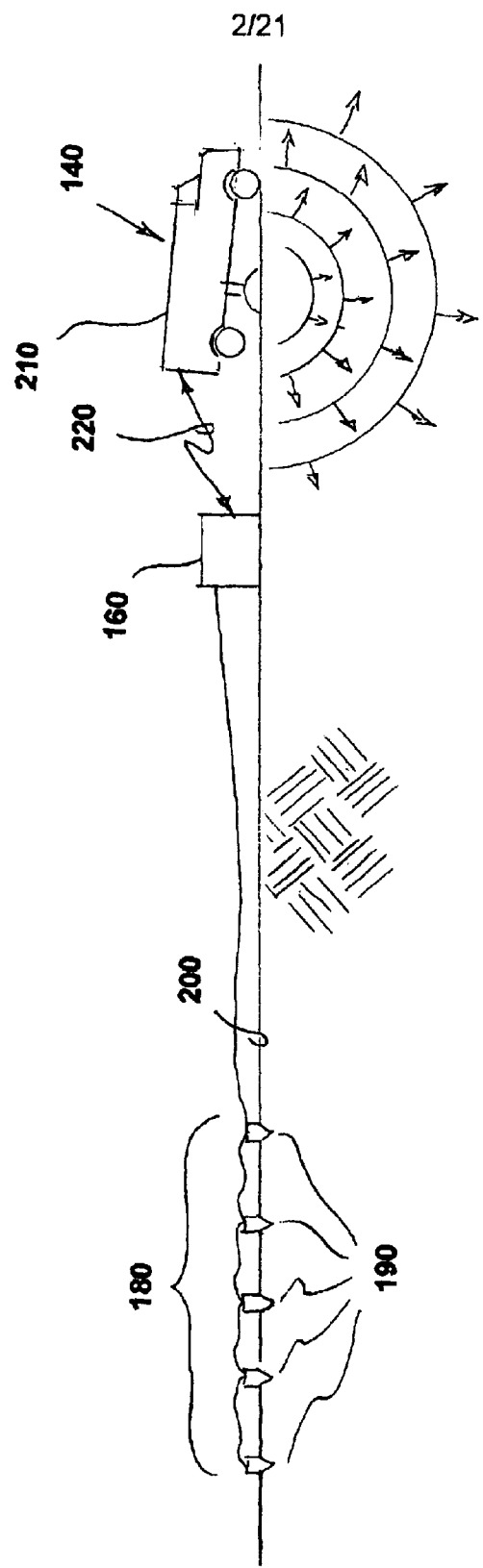
FIG. 2 is a view of a land based, fixed-site seismic source, seismic receiver array and zone controller.

FIG. 2 shows a seismic source 140 in the form of a vehicle-mounted land seismic source unit 210. Seismic waves emanating from the source 210 travel outward in all directions through the earth from the surface 200 and are sensed by seismic sensor units 190 in the seismic receiver array 180. Zone controller 160 controls both the source unit 210 and the receiver array 180. It dictates the timing and type of seismic shots and it determines the receiver array parameters. It also receives information from the source 210 about its performance and records and processes the seismic information from the receiver array. It communicates using seismic signals to the remote distributed devices 110 and 120 according to a project menu known to the devices and provided to them by the zone controller at or prior to the time of their deployment. The zone controller 160 also processes and analyzes the seismic data it receives from the receiver array 180 to determine about activity in the defense zone such as enemy intrusion or explosion of attack devices.

Figure 3:
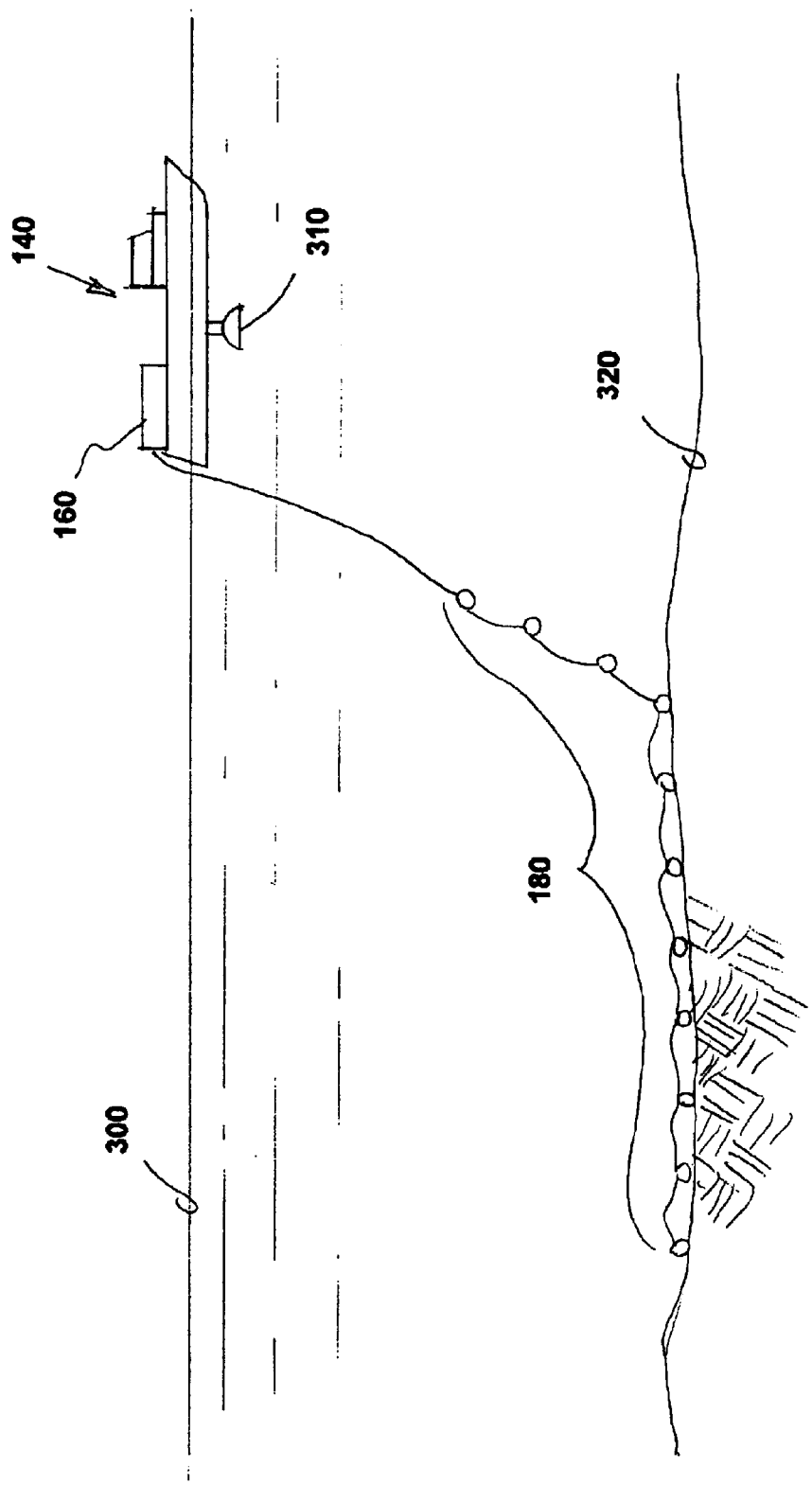
FIG. 3 is a view of a marine-based, fixed-site seismic source, seismic receiver array and zone controller

FIG. 3 illustrates a comparable embodiment of the invention for marine conditions. The seismic source 140 is in this case a vessel-mounted marine seismic source unit 310. The zone controller 160 is carried aboard the same vessel in this example. The seismic receiver array 180 is positioned in part on the water bottom and in part suspended in the water between the vessel and the water bottom. It contains marine seismic sensors 330 capable of withstanding the hydrostatic pressures encountered. The marine seismic sensors may be single or multi-component sensors as commonly used in the petroleum industry. If on the water bottom 320, the multi-component sensors can sense shear as well as pressure waves. Hydrophones are suitable for the sensors suspended between the bottom 320 and surface 300, sensing pressure waves only. Other sensors as employed in marine acoustics applications may be utilized.

The marine seismic source unit 310 must be able to maintain position within specified limits. The specified limits relate directly to the allowed limits of variation in arrival time of seismic energy from the controlled shots at the remote devices 110 and 120, These limits may be set differently for various projects depending on their specific requirements and the local seismic conditions.

If the source platform is a vessel, as in FIG. 3, the vessel must be able to maintain station, whenever seismic signaling is required, for the duration of the project. For tightly defined limits this would require dynamic positioning or driftless anchoring with multiple anchors. For less stringent limits, navigation with an accurate system such as GPS and use of a free-moving vessel could suffice. Another method is to place the marine seismic source unit on a fixed platform or to fix it to a submerged feature. If seismic range is sufficient, a land-based source unit could communicate seismically to devices placed offshore.

Figure 4:
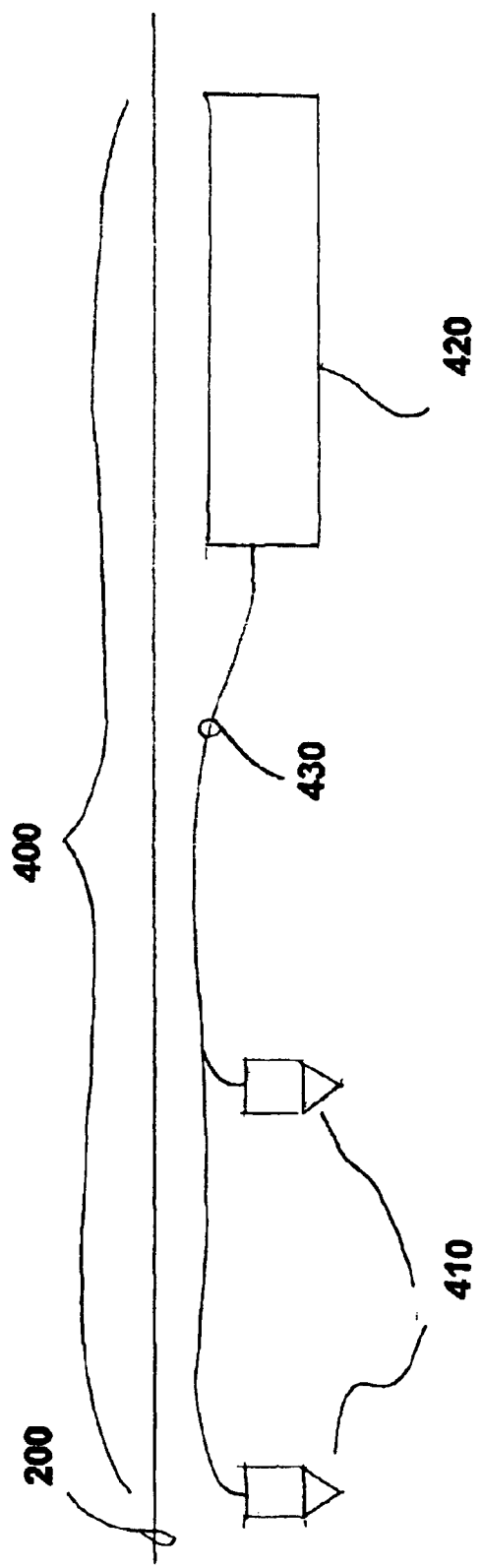
FIG. 4 is a schematic representation of a land attack device with seismic sensors.

Now referring to FIG. 4, a land attack device 400 is depicted as a member of the general class of devices 110. The attack device 400 may comprise one or more seismic sensors 410. The seismic sensors 410 may be integral with the main body of the land attack device 420 or it may physically separated as shown in FIG. 4. A wired or wireless communication link 430 connects the sensors to each other and to the main body. The subject equipment may be on the surface 200 or may be buried at shallow depth as shown. In any case the seismic sensors 410 must be well-coupled with the earth to perform their function effectively. The land seismic sensors may be conventional geophones that sense a single component of motion, generating a voltage proportional to the vertical velocity of the earth surface, or they may be multi-component geophones that sense horizontal as well as vertical components of motion. Alternatively, advanced seismic sensors that integrate sensing with digitization and other functions may be utilized. Hydrophones may be used if the surface is wet and these may be combined with other sensor types. In a typical example of a land attack device 400 the main body of the device 420 may be an anti-tank mine containing explosives.

Figure 5:
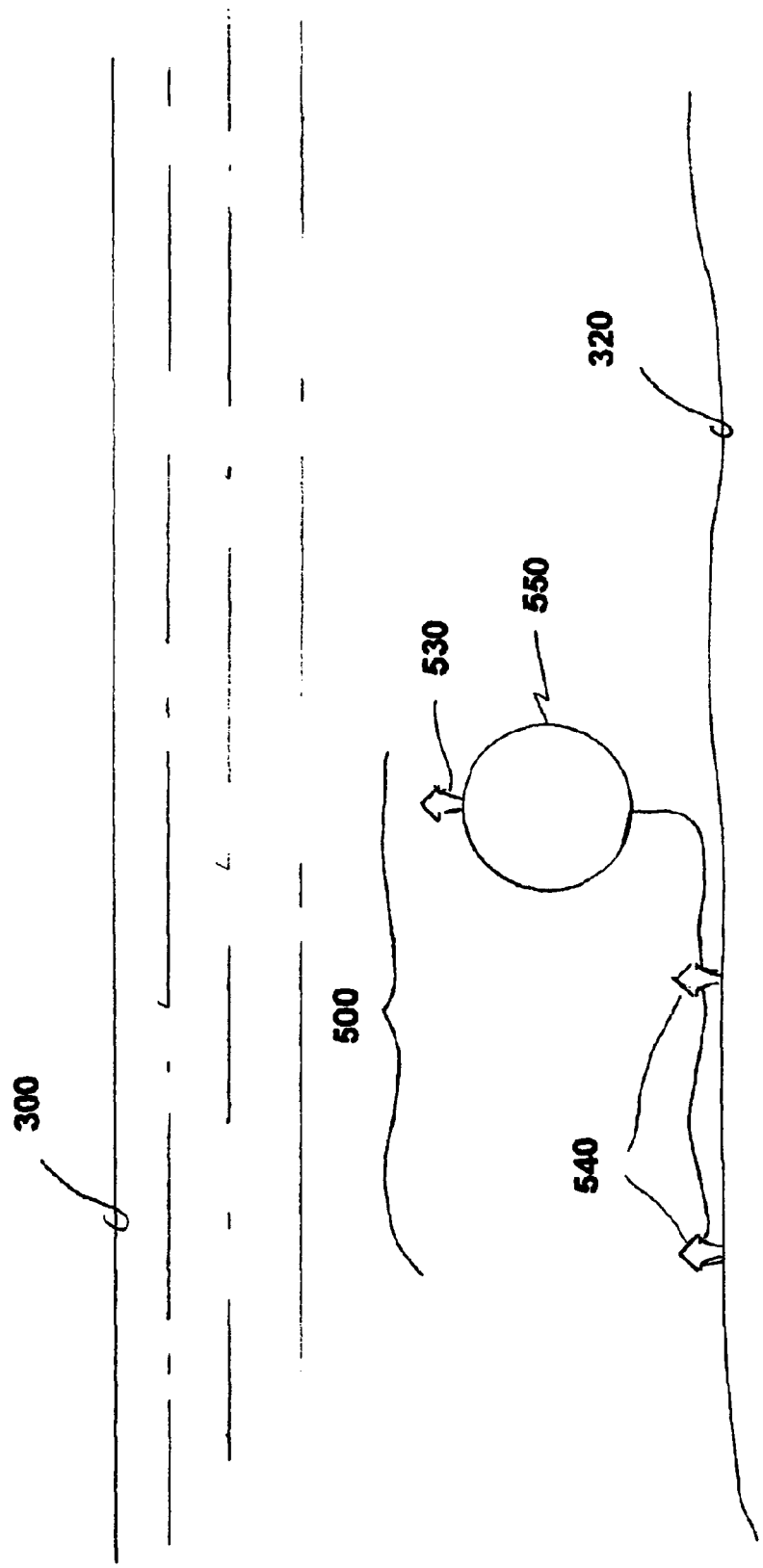
FIG. 5 is a schematic drawing of a submerged attack device with seismic and acoustic sensors.

FIG. 5 illustrates a submerged attack device with seismic and acoustic sensors 500. An integrated acoustic sensor 530 is shown as well as a detached seismic sensor array 540 residing on the water bottom 320. At least one of these two sensor types is required in order for the attack device 500 to be able to sense and record the seismic wave-field in the vicinity of the device. The device may be at any depth below the water surface 300. It will typically be at a relatively fixed position (with negligible drift) on the water bottom or tethered to an anchor on the water bottom, The anchor or other ballasting device may be releasable upon command from the zone controller 160 to allow the device to move into a preferred attack position, such command being communicated seismically according to the method of this invention. This type of marine attack device, less the seismic communication means of the present invention, is described in U.S. Patent Application Publication No. 2002/0170419.

The main body of the marine attack device 550 will in a typical implementation of the preferred embodiment comprise an anti-ship mine containing specialized sensing systems, a detonation system and explosives.

Figure 6:
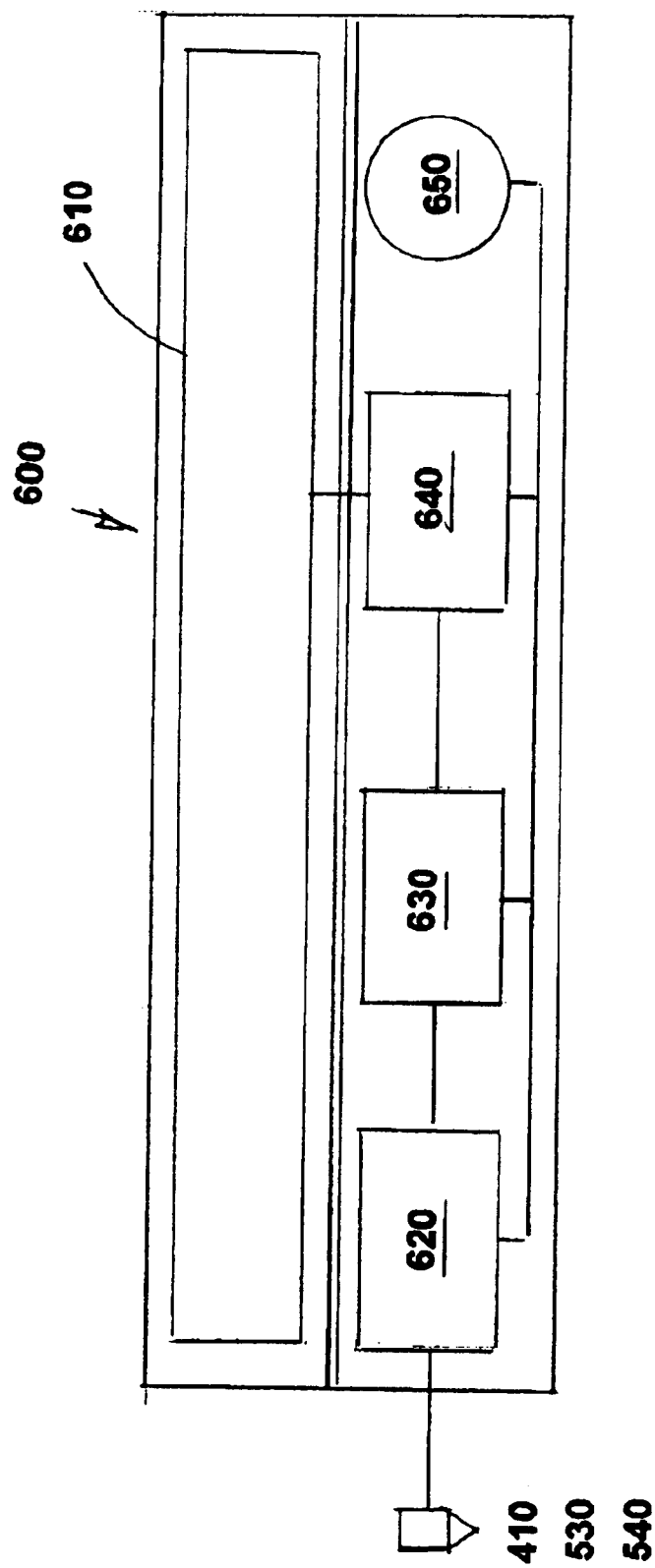
FIG. 6 is a drawing of a controllable device controlled by seismic communication.

FIG. 6 is a schematic drawing of the general configuration of a controllable device 600 that is controlled by seismic communication. The device may be an attack device 110, an illumination device 120, or other type of device that may be controlled from a remote location using seismic communication. Other examples of devices usefully controlled by seismic communication are optical sensing devices that are positioned clandestinely in order to view possible enemy movements, and active decoy systems which, when activated, confuse the enemy in some way.

The essential components of this class of devices 600 are seismic or acoustic sensors (410, 530 or 540), a seismic signal processor 620, linked to a process controller 630 that controls a device actuator 640. An electrical power supply system 650 such as a battery is combined with these linked elements. The main body of the device 610 performs the primary mission of the device and is made to perform its action accordingly as initiated by the device actuator 640.

Figure 7:
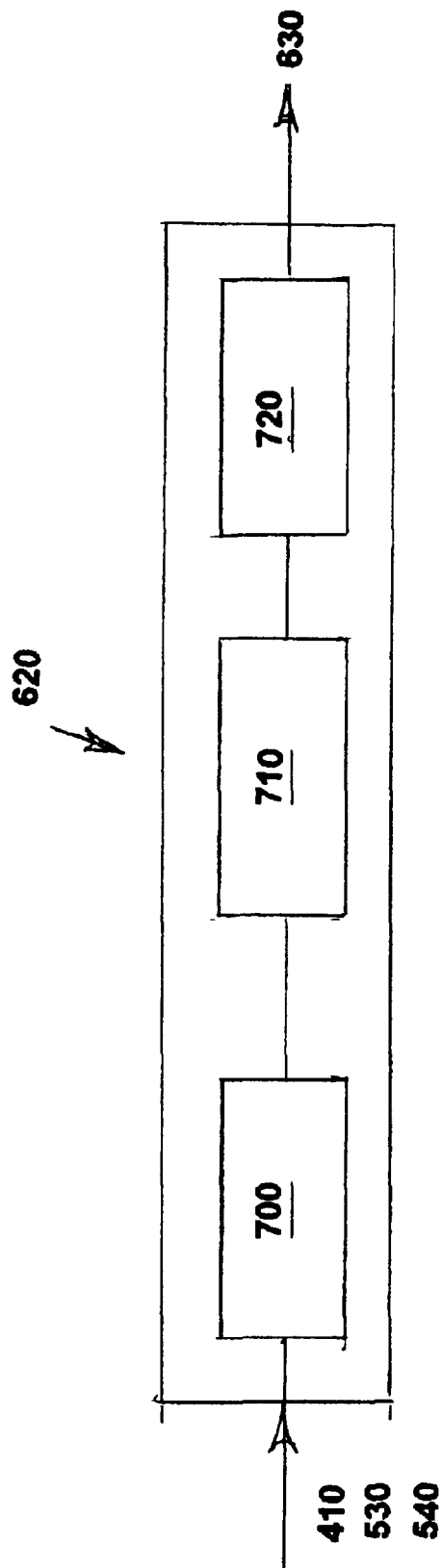
FIG. 7 is a schematic drawing of the seismic signal processor and its principle components.

FIG. 7 shows further detail of the principle components of the seismic signal processor 620. An input transformer 700 couples the seismic sensor array to the pre-amplifier and filter component 710. The filtered and amplified seismic signal is digitized by the analog-to-digital converter 720. The signal is typically digitized at 2 msec sample period or thereabout, depending on the bandwidth of the signal. Alternatively the sensor units themselves may perform the digitization function. In either case the digitized signal channels are fed into the process controller 630.

Figure 8:
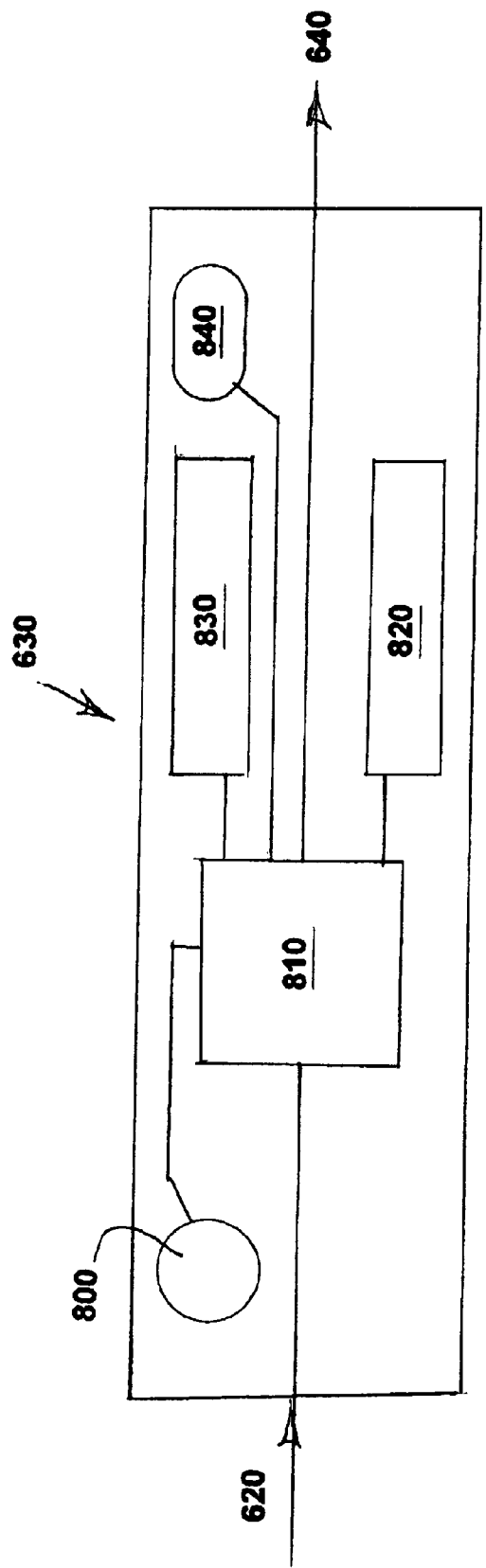
FIG. 8 is a schematic drawing of the process controller showing its principle components.
Figure 15:
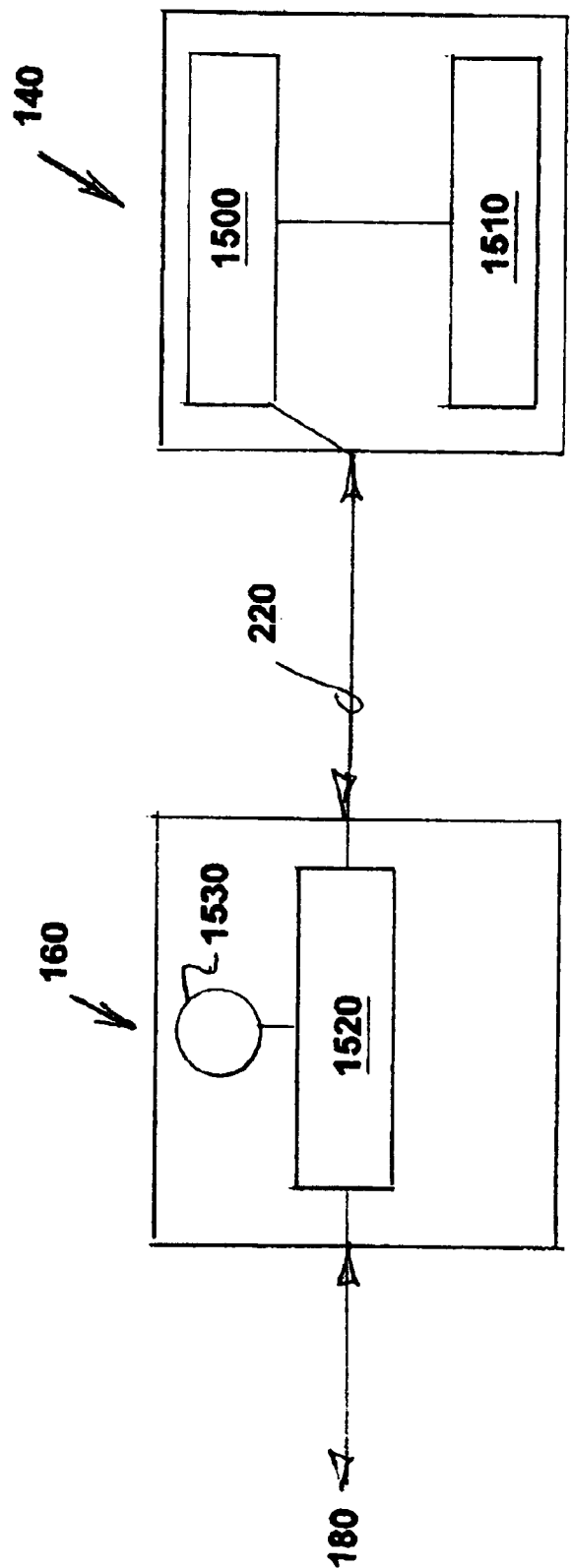
FIG. 15 provides a schematic drawing of the zone controller and its essential components.

The process controller 630 performs the main computing functions relating to seismic signal processing, seismic communication and device process control. FIG. 8 reveals in schematic form the primary components of the process controller 630 and their relationships. The digitized seismic signal in one or more channels is input from the seismic signal processor 620. Further processing of the signal as required for effective seismic communication is performed by the central processing unit (CPU) 810. The CPU must have sufficient processing capacity for application of compute-intensive processes such as cross-correlation in near real time of multiple signal channels, and may have additional processors such a DSP unit 830 attached. An internal clock 800 provides timing for communication and process control purposes and may be synchronized periodically with the master clock 1530 (FIG. 15) maintained by the zone controller 160. Alternatively a GPS subsystem may provide timing and serve the clock purpose. The processor accesses memory unit 820 and optionally utilizes auxiliary memory in a form such as hard drive (HDD) 840. Program and parameter input to the CPU 810 may be via the same port used for seismic input or by another means.

Figure 9:
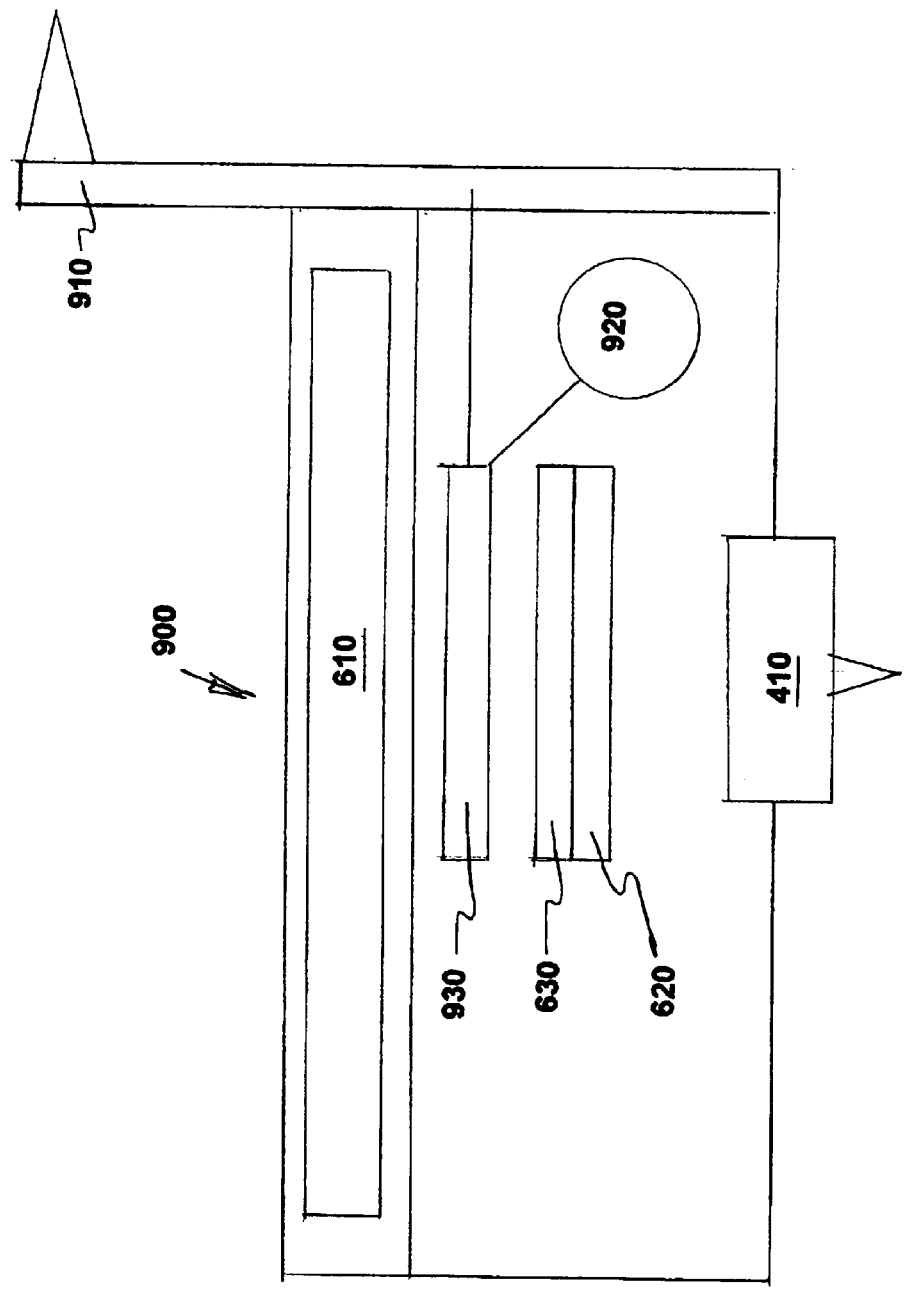
FIG. 9 schematically illustrates a land mine linked to a seismic sensor and an independent sensor for target detection and in which the seismic sensor is also used for seismic communication from the zone controller.

In FIG. 9 a land mine 900 with the capabilities of the present invention for reception of seismic signals, seismic signal processing, process control and actuation by remote command is shown in a schematic view. In this illustration the mine is indicating a disarmed state with status indicator 910, a raised arm, having received a seismic signal generated by the seismic source 210 under the control of the zone controller 160 commanding this mine specifically to disarm. The seismic sensor 410 in this case is shown in a position extended downward from the body of the mine, ensuring good contact with the earth, but is not detachable from the mine. This sensor is also utilized by the mine for target detection. A magnetic target detection system 920 provides an independent means for target detection. Because of the powerful processing capability of the integrated processing controller 930 of the mine, it can perform multiple functions. It is programmed to perform all of the processing required for seismic communication, and also processing of the ambient seismic wave field for seismic target detection, magnetic target detection, as well as control of the actuation of the mine.

The zone controller 160 and land seismic source unit 210 shown in FIG. 2 each comprise a computer with typical features as are available in a high-end notebook PC (circa 2003). As represented by the FIG. 15 schematic, the zone controller computer 1520 is programmed with typical petroleum industry seismic data acquisition software as available commercially from Geo-X Systems Ltd under the product name ARIES. This software is augmented by the software necessary for the special purposes of seismic communication and military defense zone control as required in the preferred embodiment of the present invention. The human operator controls the zone controller computer system and its programs using keyboard, mouse, touchpad, media input, wireless communication or any other available means of interaction. The zone controller 160 also contains a project master clock 1530 which is essential to the timing functions that are fundamental to the seismic communication method of the invention. The clocks 800 in the controllable devices 630 of FIG. 8 are synchronized with the master clock 1530 at the beginning of the project and periodically thereafter as may be required.

The master clock 1530 is essential for correct seismic communication and should be an accurate clock with stability, for example, of better than $10^{-9}$ as available from OCXO devices or equivalent. The zone control computer system 1520 as previously described is shown with communication links to the seismic receiver array 180 and the seismic source 140. The seismic source has a source control computer 1500 that controls a seismic signal generator 1510. Quality control of the seismic source performance is performed by both the source control computer 1500 and the zone control computer system 1520. The seismic receiver array 180 provides a real time indication of the source performance and the data it provides can be analyzed by the zone controller to verify correct seismic signaling.

After deployment, the synchronization procedure utilizes the same signals as used for seismic communication according to the method of the invention. The zone controller 160 may optionally access GPS time to maintain accuracy of the master clock 1530.

Under the authority and according to the specifications provided to it by the zone controller computer 1520, the source control computer 1500 commands the seismic signal generator 1510 to function as a seismic source 210 when and in the manner required to carry out the seismic communication tasks. The source control computer 1500 requires only the capabilities normally provided in commercially available seismic source systems.

It should be understood that the invention is not limited to the exact structure disclosed in FIGS. 1–9 and FIG. 15. Electrical and mechanical elements and sensors may be added to the system as desired, and some of the components of the preferred embodiment may be integrated with other components or eliminated. The computing (and data storage) functions of the signal processors, the process controllers and the controlled devices, may be combined if so desired by providing one computer and programming it to perform all of the required functions. Conversely, redundant components may be provided to guard against system failure.

Figure 10:
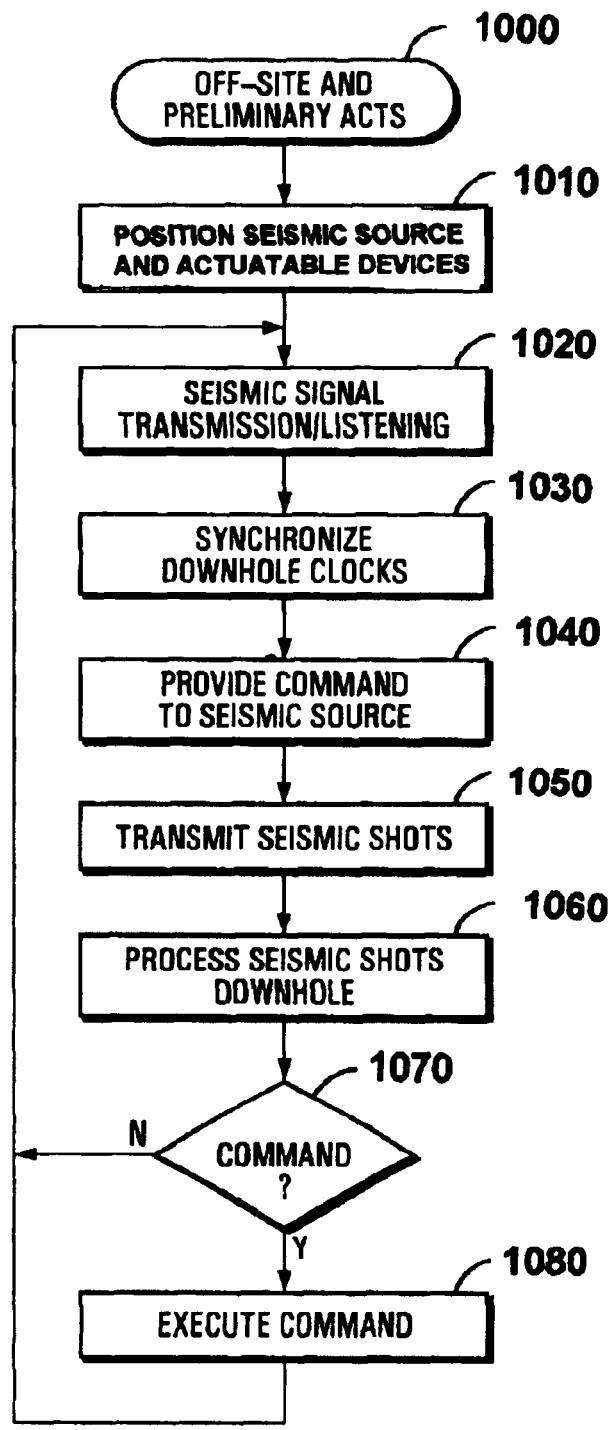
FIG. 10 is a flowchart of a preferred method of seismic communication that results in actuation of the controlled device and performance of the action.

FIG. 10 is a flowchart that outlines the process which is followed in order to effect seismic communication according to the method of the preferred embodiment. Prior to establishment of the defense zone, a plan is established: devices of various capabilities are selected for use, a map of deployment locations is established, location of essential control sites is determined according to the particular requirements such as effective range of communication, etc. The requirements of the project are used to define a project menu for seismic communication as exemplified by Tables 1 and 2. These menus are loaded in the process controllers 630 of each remote device 600 and in the zone controller 160. Device clocks 800 are synchronized to the master clock 1530. In the flowchart this activity is termed 'offsite and preliminary acts' (step 1000).

In the next step, 1010, all of the hardware, including the seismic source 140, is deployed to the planned positions. Changes in the planned locations are readily accommodated without need to modify project menus according to the method of the invention.

When a portion of the devices as well as the zone controller 160, seismic source 140 and the seismic receiver array 180 are in position and activated for operation, seismic signaling transmission and listening commence (step 1020). The devices record and store seismic signals at programmed times. If an initial signal from the seismic source is detected at one of these times, it is saved as a first reference signal for later correlation purposes. After a reference signal has been sent, the operator may provide a command to the zone controller 160 for transmission to the devices by the seismic source (step 1040). The seismic source 140 transmits the seismic shots accordingly, in programmed time windows known to the devices, to convey the information to the devices (step 1050).

The remote devices 600 each independently receive and process the seismic signals at the expected times of transmission. According to the definitions in the project menu they interpret the meaning of the signals (1060). If a valid command for the device is contained in the message (1070), it is executed accordingly (step 1080). If still extant, the device then returns to listening for further signal transmissions.

Figure 11:
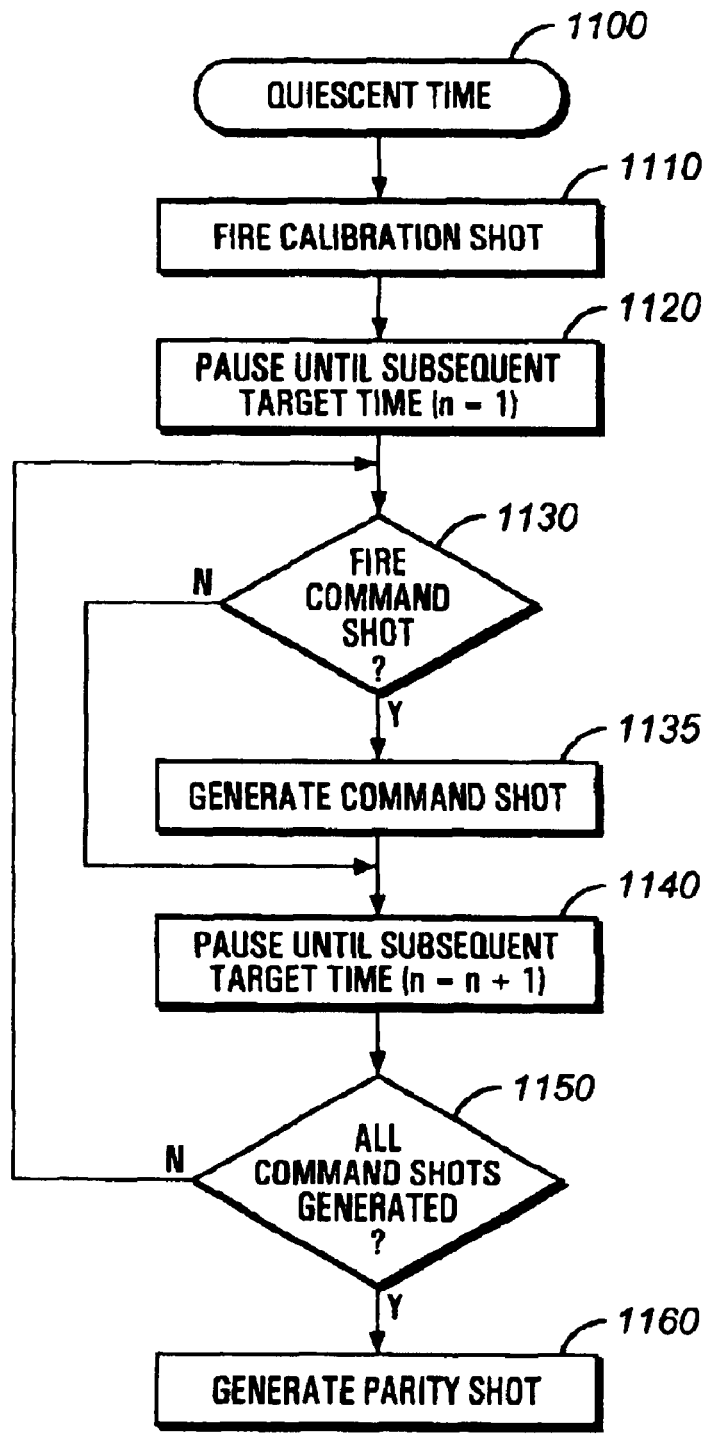
FIG. 11 is a flowchart of a preferred method for the communication of a command sequence by the seismic source.

FIG. 11 is a flowchart that describes the operation of a seismic source control computer 1500 and seismic signal generator 1510 in a typical seismic signaling sequence. Multiple seismic shots are generated to form a complete message. After an initial quiescent time (step 1100) a first shot is initiated, called the calibration shot (step 1110). After a pause until the next target time, which is the potential time according to the project menu for a shot (step 1120), a decision is made whether to fire a command shot (step 1130). If according to the signaling requirements and the project menu, a shot is required, it is generated (step 1135). Following this a pause until the subsequent target time is taken (step 1140). When all required command shots have been generated (step 1150) a final information verification shot is generated, called the parity shot (step 1160).

Figure 12A:
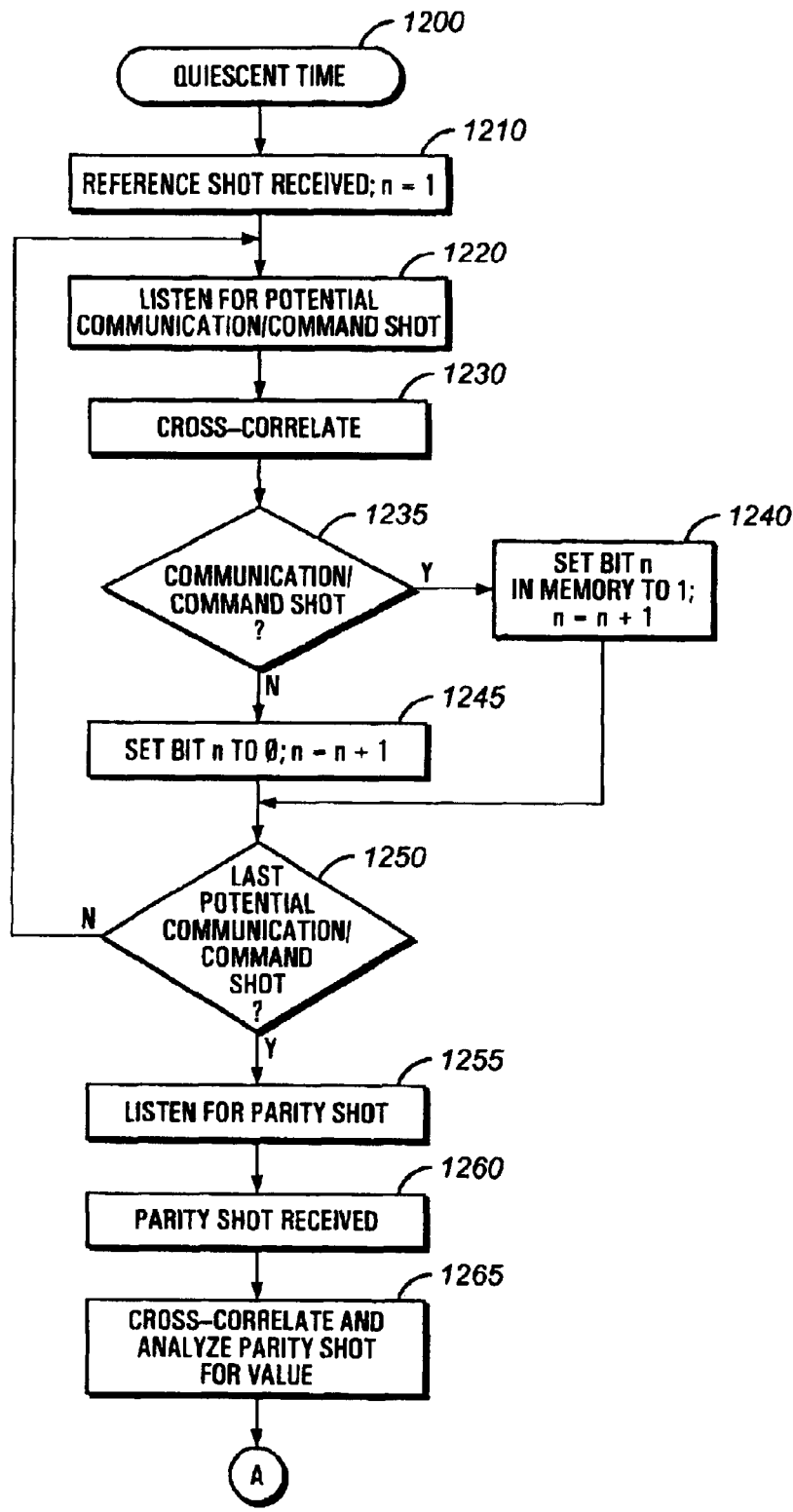
FIGS. 12A and 12B are a flowchart of a preferred method for the receiving the communication of a command sequence at the remote controllable device and performing the commanded action.
Figure 12B:
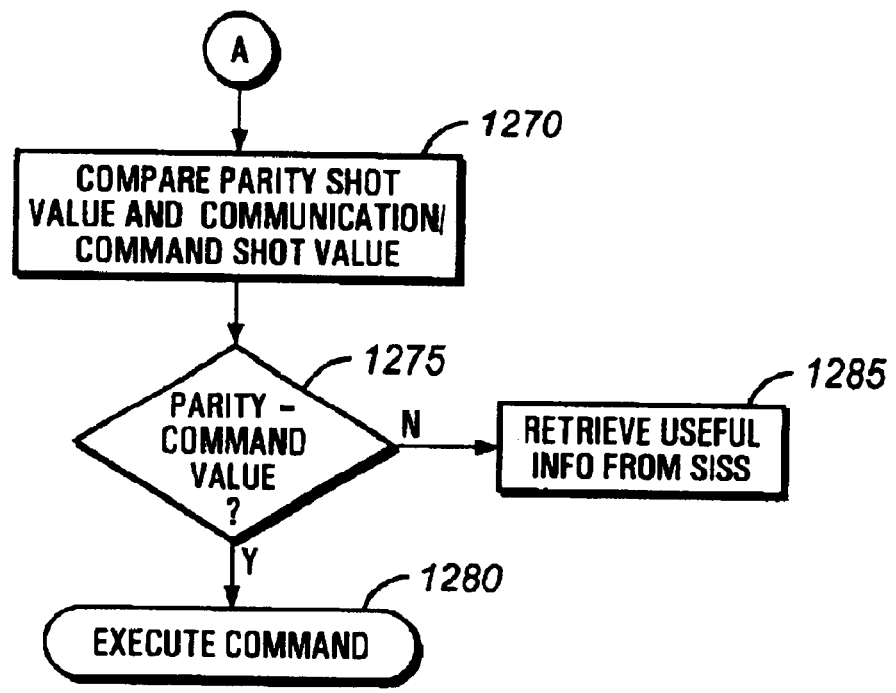

The flow charts of FIGS. 12A and 12B describe the method of receiving and processing seismic signals at the remote, seismically controlled actuatable device 600. After activation, the device 600 listens during prescribed time windows for possible signal transmissions from the seismic source 140. After an initial quiescent time (step 1200) the device listens for a potential signal during a series of prescribed time windows. When an initial signal is perceived during one of these time windows, it is stored as a reference shot (step 1210). Wave form characteristics such as for a given swept frequency signal or other criteria may be used to establish presence or absence of a valid shot. Next the device listens in a subsequent time window for a potential communication or command shot (step 1220). A signal recorded in this time window is cross-correlated (step 1230) or otherwise compared for similarity to the reference shot. If pre-set criteria are met, e.g. cross-correlation peak value greater than 0.7, the shot is deemed valid and the result stored by setting bits in memory (steps 1240 and 1245). A series of such command or communication shots would normally be required to complete the communication and the process continues through the prescribed number of potential shot windows. When it is determined that the correct total number of command and communication shots time windows have transpired, according to the project menu (step 1250), the device listens for the parity shot (step 1255). When it is received (step 1260) the parity shot is cross-correlated and its peak time analyzed (step 1265) to confirm validity of the total communication (step 1270). If validity is not confirmed there still may be some useful information in the shot series and if so it is retrieved by the device and used accordingly (step 1285). If the entire communication is deemed valid the contained command is executed by the device (step 1280).

Figure 13A:
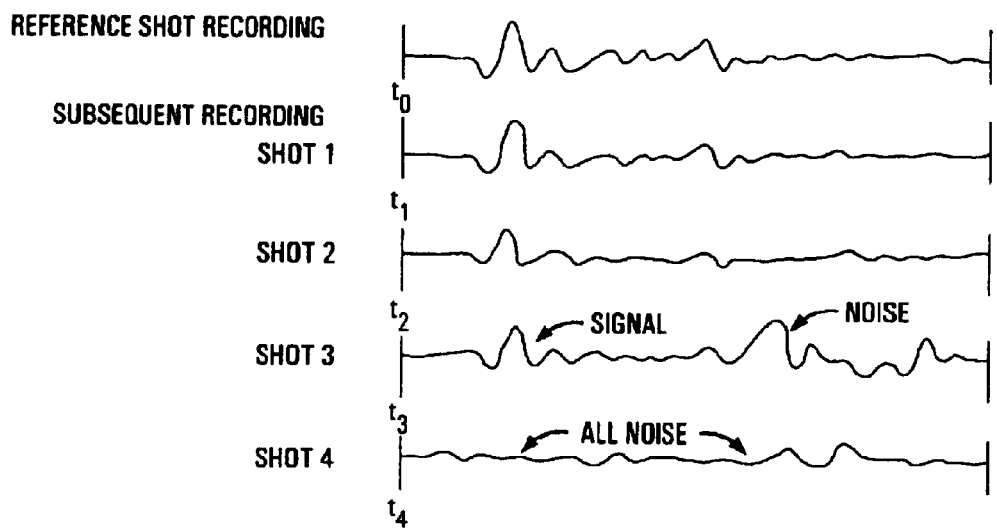
FIGS. 13A and 13B illustrate the signals received at the remote controllable device and their cross-correlations.
Figure 13B:
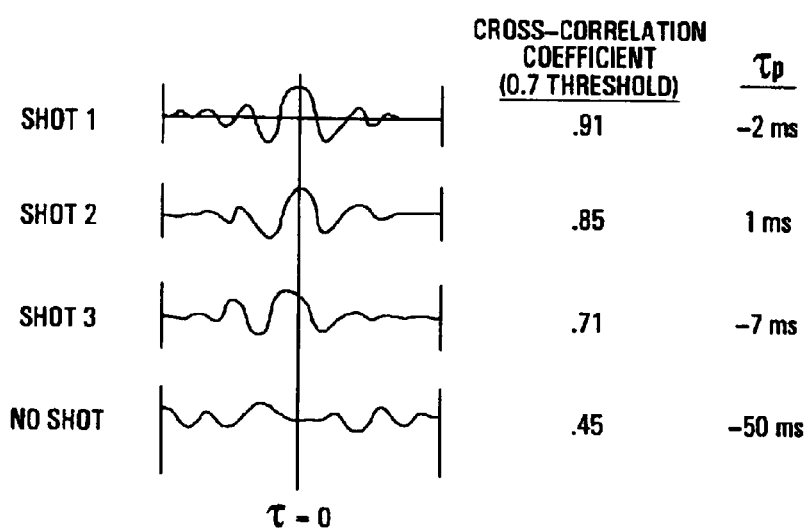

FIGS. 13A and 13B illustrate an application of the cross-correlation method. However, numerous processing techniques are known in the field of signal processing to determine whether a signal has been received and each of these is available to one of ordinary skill for this invention. In FIG. 13A, the analog trace of a reference shot is shown. The reference shot trace is followed by four other seismic traces that the menu dictates to be potential communication shots. In FIG. 13B, cross-correlations of each of the four other traces with the reference shot recording are shown. Three of the four cross-correlations have positive peak amplitudes which exceed the threshold value which was set for the identification of a shot (0.70). The fourth correlation does not have any amplitude which exceeds the threshold and therefore it is deemed that no shot occurred. In practice, a correlation coefficient threshold of 0.70 would ensure a high likelihood that "no-shot" instances would not be improperly identified as shots. In this manner correlation coefficients can be used for each pair of (potential) shots being compared and used to appraise the quality of the results. If the correct peak time, or a set of correct possible peak times, of the cross-correlation is known, such as in the implementation of the preferred embodiment, any deviation from the nearest value can also be used as a quality criterion. Other similar quality criteria thresholds can be established to aid in the decision making regarding actions to take as a result of the seismic communication.

A powerful advantage of the cross-correlation method for comparing like seismic shots from fixed sites at fixed receiver positions, is that no a priori information or generalizations about the wave form of the seismic energy from the shots need to be made. All source-generated seismic energy received is useful signal to the method, regardless of propagation mode. No assumptions need to be made or models built to predict the signal waveform. All that is required is that the signal be strong enough relative to the ambient seismic noise.

If at the limits of the signal range, means of strengthening the signal are available and include taking multiple shots and summing prior to correlation, using longer Vibroseis sweeps, using lower frequency Vibroseis sweeps, utilizing multiple source units or employing multiple seismic sensors.

As indicated in Table 2 of FIG. 17, a series of nearly identical seismic shots ("SISS") are used to communicate from the zone controller to the remote device. A particular SISS is initiated only at start-of-programmed-time-window time (defined in the program menu) plus integral multiples of the parameter ZPTW (programmed time window interval), also contained in the menu. Within each SISS, shots may be initiated only at integral multiples of the unit time step. These basic rules preferably bound the timing of every seismic shot and enable the method of signaling.

Shots are initiated at precise times as called for in the menu. Alternatively the menu may call for a binary shot/no-shot signal scheme wherein if a shot is taken and detected, a binary value '1' is communicated; and the absence of a shot in the time window indicates a binary value '0'.

In the preferred embodiment the information-carrying seismic shots are designated as either communication shots or as command shots. Communication shots may be timed to arrive at one of numerous target shot times. Each target shot time corresponds to different transmitted data. Conversely, each command shot is timed to arrive at only a single target shot time, ensuring either a "1" or a "0" based upon the presence or absence of a shot. In this way, information that can be put at risk of error may be transmitted as a communication shot, improving the data transmission bandwidth for this data. Information that must receive the highest reliability (such as a detonate command) can be transmitted using one or a series of identical command shots.

It can also be appreciated that each transmitted communication/command shot may be used to correct for clock drift as generally explained herein and in U.S. Pat. No. 6,002,640.

Referring back to FIG. 11, at step 1110 in response to a command or a pre-programmed signal, the surface seismic source array 210 generates or fires the first seismic signal in the SISS. This first seismic signal is called the reference shot or calibration shot and is the timing reference for the remainder of the SISS shots in the command sequence. It is used as a timing reference for additional SISS shots if so desired, and may be used to synchronize the remote device clock.

At step 1120, the surface seismic source pauses until the next seismic shot target time. Careful timing of the seismic shots is important for a number of reasons. First, adequate spacing of the seismic shots helps reduce interference and improves the signal-to-noise ratio of the seismic signal. Second, the timing of an SISS affects the interpretation of the command, as explained below, and a mistimed shot corrupts the command sequence. Third, the process controller 630 can use the SISS shots as a mechanism to compensate for the clock drift of its internal clock 800 (i.e. synchronize its clock).

Step 1130 is the decision whether to fire a command shot at the target time that corresponds to a communication bit "n" of the command sequence. At the time of a first potential command shot, n=1. In the preferred embodiment, a binary communication protocol is employed with a firing of a seismic shot at the shot target time communicating a "1" to a device. The absence of a seismic shot at the shot target time communicates a "0" to the remote device. Thus, the decision at step 1130 equates to whether the first bit of the command sequence is equal to "1" or "0".

If the first bit of the command sequence is a "1", then at step 1135 a seismic shot is generated at the fixed site. If the first bit of the command sequence is a "0" then the method proceeds directly to step 1140 without generating a surface seismic signal.

At step 1140, the seismic source once again pauses until the next seismic shot target time.

At step 1150, the zone controller computer 1520 references the applicable menu to determine whether all the command shots necessary for the command sequence have been generated by the seismic source. For example, each command sequence for the applicable program menu may include 16 bits of information. If there remain command shots to be generated at the surface, the method returns to step 1140 and determines whether a "1" or a "0" is to be next transmitted. If, according to a preprogrammed set of menus, all the command shots have been fired, then the seismic source fires a parity shot or shots at step 1160.

The parity shot (or shots) is a quality assurance mechanism that specifies how many seismic communication/command shots were fired at the surface (e.g. how many "1" bits exist in the command sequence transmitted to the remote device). For example, if eight seismic shots were generated during the command sequence, the parity shot would have a value of eight. The exact protocol chosen to communicate the parity value "eight" to the remote device is left to the operator. A time window with at least eight target times would suffice, as would a series of four parity shots communicating eight in binary (i.e. 1000). Other variants to communicate the parity value are also within the skill of the artisan. If additional communication/command shots are to be transmitted, the process is repeated.

Referring again to FIGS. 12A and 12B, series of steps for the zone controller 160 are illustrated. The process controller 630 has the capability to determine very accurately the time of arrival of each shot. Therefore it can use the same menu possessed by the zone controller 160 to interpret the signal that was transmitted by the seismic source 140.

At step 1200, a quiescent period occurs during which no SISS shot occurs. Just prior to the next scheduled programmed time window (PTW) for source emissions, the process controller 630 activates the digitizing and recording functions to store digitized values of the sensor outputs in its memory. Thus, at this time, the process controller 630 listens for a first shot of an SISS.

At step 1210, the remote device seismic sensors detect a calibration or reference shot. This reference shot is the timing reference for the subsequent communication/command shot and defines the first target time.

At step 1220, the process controller 630 listens for a next seismic shot. The process controller 630 records detected seismic activity over a SISS Record Duration time window that includes the target shot time. Because this window may or may not be occupied by seismic activity indicative of a seismic shot from the fixed site (depending, e.g., on whether a "1" or a "0" is being transmitted), the process controller 630 is said to be listening for a "potential communication shot."

At step 1230, the process controller cross-correlates the calibration shot to the potential communication/command shot to determine if a seismic communication/command shot was detected by the seismic sensors. The cross-correlation process provides a powerful mathematical means of determining the presence or absence of a subsequent shot after the reference or timing shot; and if the subsequent shot exists, the peak time of the cross-correlation can be measured and interpreted to yield the value of the time elapsed between the two shots. Other mathematical formulations which allow comparison of two time series can be used in lieu of the cross-correlation method to accomplish the same purpose. As used herein, the term cross-correlation is used to represent the entirety of this class of mathematical methods. Specifics of a preferred technique of cross correlation are explained with respect to FIG. 13.

If at step 1235 a communication/command shot was received, then at step 1240 the process controller 630 sets a bit in memory as having received a communication/command shot. In this instance, bit 1 (the first bit of the command sequence, n=1) in the memory 820 of the process controller is set to a value of 1. If at step 1245 a communication/command shot was not received, bit 1 is set to or kept at a value of 0. The bit count is then advanced by one (n=n+1).

At step 1250 it is determined from the project menus whether the last potential communication/command shot of the command sequence has been received. If not, then the method listens for the next potential communication/command shot for bit 2 (n=2) at step 1220. If the last communication shot of the command sequence has been received, then listening begins for the parity shot at step 1255.

At step 1260, the parity shot is received. At step 1265, the parity shot is cross-correlated with a previous SISS shot, either the reference shot, a later shot, or some combination of earlier shots, and the value transmitted by the parity shot is determined. As explained above, the exact methodology to determine the value of the parity shot is user and operation specific and may be chosen according to the desires of the user.

At step 1270, the parity shot value is compared to the value corresponding to the transmitted communication/command shot. Typically, the parity value will be equal to the number of command shots received. Following this protocol, if at step 1275 the parity value equals the number of command shots received, or the parity shot otherwise confirms the proper transmission of communication shots, the command or commands contained in the command sequence are executed by the process controller 630 and the controllable device 110 or 120 at step 1280. If at step 1275 the parity value does not equal the number of command shots received (or reflects some other error in transmission), there has been an error in transmission and the command or commands are not executed by the process controller 630. Nonetheless, depending on safety and the desires of the operators there may nonetheless be useful information in the command sequence that can be derived at step 1285. For example, in Table 5, the parity check fails because only 18 shots were detected and the parity shot indicates 19 shots were fired. In this example, one of the eight shots which by the protocol of the menu are required to be either all present or all absent is in disagreement with the other seven. Useful information readily believable from this "failed" communication includes the project menu identification (PM2), the K Gain setting (42 db), and the ARM command. Furthermore, it is very probable that the DETONATE command was intended to be communicated as 7 out of 8 shots were detected. Thus, all or nearly all of the information intended can be derived from the communication. a technique of cross correlation includes comparing two recorded seismic shots and deriving a degree of fit between them. If a high degree of fit is present, the later recorded seismic shot can be reliably considered detected. The time of arrival can also be reliably measured for each shot of the SISS. These times of arrival that can be employed to synchronize the remote device clock to the master clock as described in U.S. Pat. No. 6,584,406.

A threshold value or "correlation coefficient" can be set or established that, if exceeded by the peak amplitude of the normalized cross-correlation, indicates that a communication/command shot was received. The threshold value can be adaptively set based on observed signal-to-noise ratios, or may be preset at the surface prior to defense zone deployment. The example in FIGS. 13A and 13B shows a pre-set correlation coefficient threshold is a value of 0.70. If this value is exceeded it is extremely likely that a shot was in fact initiated. Absolute identity of the two functions would yield a correlation coefficient of unity.

Where SISS shots are used to communicate commands or information to the defense zone components, the values corresponding to one or a series of command/communication shots are translated into commands and information according to a set of Menus programmed in the zone controller 160 and device process controllers 630, such as shown in Tables 2–5. Each menu comprises a table of shot time values versus message information enabling each CPU to translate delays between seismic shots and the presence/absence of shots into usable information. For a particular CPU, a general menu is established which defines the most general case for the capabilities of that CPU or controllable device. Each general menu is composed of many variables, including a unique identifier. Standard defaults may be provided for certain variables. If there is not a general default for a variable, it may be determined solely by the SISS, and thus the general menu can be used directly (as can any menu).

For a given project, a single project menu is defined which includes all of the parameters of the applicable general menu and adds all of the project-specific parameters that apply. The project menu also establishes any variable that will not vary throughout the project or production schedule by means of setting default values. The project menu further defines project ranges and valid values for other variables. The project menu may further be divided into a number of subsets called "set menus." Each set menu further defines other variables, and thus reduces the number of parameters that can be changed. Examples of parameters are recording schedule, the target shot times, and the maximum clock drift. Other parameters in a menu include constant gain setting, sample period, record length, record interval, and filter settings. Yet another parameter could be an indication of previous source drift. An SISS may also convey the identification of the next applicable Set Menu and recording or "listen" start and end times.

Some parameters are not explicitly stored in the Menus, but rather are algorithmically computed from the shot interval times and/or number of shots in the SISS. As many set menus as required will be programmed for a particular project. A benefit of defining the lower level Menus is to limit the number of shots in the SISS, to reduce the amount of time and effort to complete the SISS, and to minimize the chances of error during communication.

The SISS can be used to enable a more specific menu, such as a set menu, and thereby set additional default values. The SISS can also be used to enable a more general menu. In addition, the SISS can instruct a portion only of the process controller 140 to sleep or ignore subsequent commands, or to change menus, for example.

The communication/command shots, in combination with the reference shot, may also be used to synchronize the process controller docks 830 with the master clock 1530 in the zone controller 160. Such re-synchronization is limited to correcting only that part of the clock drift which occurred following the reception of the first shot after the remote elements are in place. Nonetheless, the ability to synchronize the remote clocks is particularly useful because of possible extreme temperature variations that deteriorate clock performance and because of potential long-term deployment.

Figure 18:
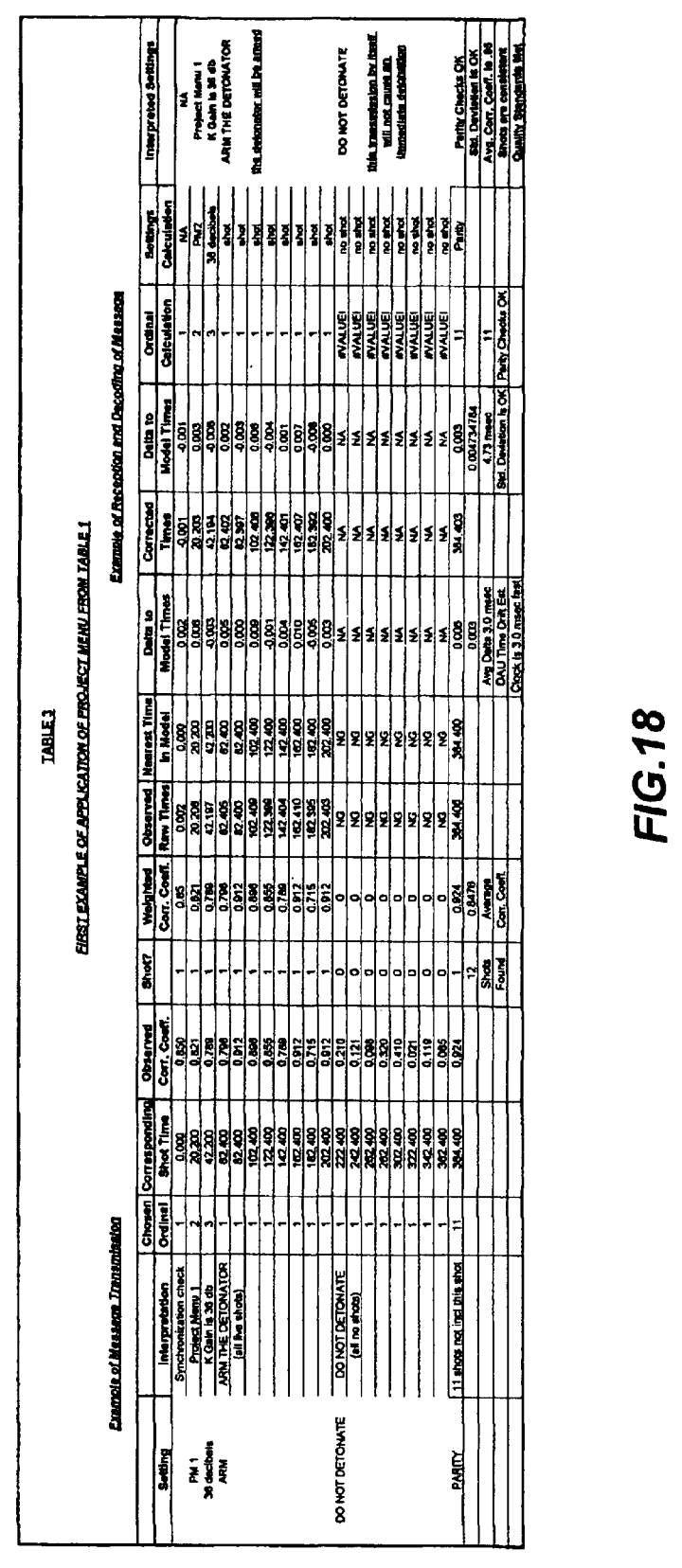

For a given military project, a set of requirements for the seismic communication are defined beforehand. These requirements are used to establish project parameters and communication standards which are incorporated in the form of project menus. An example of a project menu is shown in Table 1 of FIG. 16 and Table 2 of FIG. 17. Examples of application of the project menu from Table 2 are shown in Tables 3, 4 and 5 (FIGS. 18, 19 and 20).

Table 1 provides an example of the parameters that would be fixed for the project and Table 2 contains a corresponding example of variable parameters for the same project. These variable parameters include all of the parameters that can be communicated by seismic signaling to the remote devices. In general they will match the controllable features of the devices in the defense zone. Great flexibility in design of the parameters is available and individual devices can be addressed independently. The variable parameters may include control settings for any elements of the defense zone system such as the seismic receiver, the power supply or for the actuatable device. The actuation commands for the actuatable device are the second class of variable parameters and as such are of primary importance.

The human operator provides instructions from time-to-time to the zone controller computer which translates these instructions into a coded command sequence according to the project plan as embodied in the pre-programmed project menus. The remote devices also contain the project menus, having been provided them at time of deployment, and are programmed to be able to translate seismic signals into germane information and commands using the menus.

The project menu example of Table1 includes a series of parameters that are held constant throughout the project. The four variable parameters of Table 2 are those that are to be conveyed by seismic communication from the fixed site 130. In this example, they are (1) the identification of the menu to be used in the next PTW; (2) a K gain or preamplifier gain setting for the seismic receiver, (3) an arm/disarm switch for the controllable device which, in this example, is a land mine; and (4) a detonate command for the mine.

The final shot shown in the menu of Table 2 conveys a parity parameter. In this case the parity parameter is set equal to the number of previous seismic shots in this particular occurrence of the menu application. The parity parameter can enable the process controller 630 to verify that the received message is internally consistent and thus provide powerful quality assurance to the method.

Referring to Table 2, the columns entitled "Earliest Shot Time" and Latest Shot Time" show the earliest and latest times at which a particular shot may be taken. The particular time within this range at which the shot is actually taken is chosen such that an explicit value of the parameter is indicated. For example, the parameter K will have one of four possible values. If the first value is chosen the shot will be initiated at the start time of the PTW plus 41.800 sec; if the second value is chosen the shot will be initiated at one UTS later, i.e. 42.000 sec; if the third value is chosen the shot will be initiated two UTS later at 42.200 sec; and if the fourth possible value is chosen the shot will be at 42.400 sec.

This is shown in Tables 3–5 of FIGS. 18–20 for three different communications using the same project menu design from Tables 1 and 2 and is discussed later in this section.

Variations to this method may be made and still be within the scope of the teachings herein. For example, as disclosed above, the first shot of the SISS (after activation of the remote elements) provides a reference used in detecting and measuring the arrival time of subsequent shots of the SISS. The time segment from the start of the recording to the end of the listen time for the first shot is this reference function and is used to cross-correlate or otherwise process all subsequent recording of the first SISS.

The reference function chosen for subsequent SISS may also be an alternative reference function formed from a combination of prior SISS recordings, or it may be taken directly from a subsequent SISS recording. The purpose in combining prior recordings to form a new reference function is to improve the signal-to-noise ratio in the reference. Summing or diversity stacking prior recordings with appropriate time shifts is a convenient method of forming an improved reference function. Care must be taken to correctly measure and account for any clock drift in the signal processor prior to summing.

The signal processor stores the seismic recordings from the earliest possible time of arrival of seismic waves from the earliest possible shot in the SISS until a pre-determined listen time (LT) after the last possible time for a shot to be initiated in the SISS, but may omit buffer times.

Tables 3–5 show examples of the usage of shot presence/absence determination and correlation peak times and correlation coefficients in interpreting the intended message.

In Table 3 a specific case of applying the menu in Table 2 is depicted. The human operator has decided to communicate the parameter settings shown in the two leftmost columns to the process controller. He wishes to designate Project Menu 1 for the next PTW, to set K Gain at 36 dB, to arm the detonator, but not to detonate at this time.

These choices are translated into times of eleven seismic shots which form the SISS. The times of these shots (relative to the start time of the PTW) are shown in the column labeled "Corresponding Shot Time". They range from 0.000 sec for the first shot to 384.400 sec for the parity shot.

The cross-correlation method previously described may be used to determine the presence or absence of each possible shot. If the correlating coefficient exceeds a value of seven tenths (0.7) the shot is deemed to have been taken. The results are shown in the column entitled "Shot?" with values of 1 for "shot" and 0 for "no shot". Further use of the calculated cross-correlations is made to determine the measured time of initiation of each identified shot. These times are shown in the column labeled "Observed Raw Times." If no shot was identified at the time of a potential shot "NG" is indicated in the column.

The signal processor finds the nearest time in the menu model for a possible shot and compares it to the observed raw times. An average difference between observed and model times is calculated and applied as a correction to the observed times. This yield the results labeled "Corrected Times."

The differences between model times and corrected times are shown in the column entitled "Delta to Model Times." The standard deviation or other measure of the scatter of these difference values may be used as another quality assurance criterion. If a preset threshold is exceeded the message could be rejected or marked as suspect in quality.

The parameter values are determined from the corrected times and shown in the column entitled "Settings Calculation." This determination is made by the signal processor using the menu which it was given during project initialization at the surface. A simple matchup of values with the determined shot times via the ordinal count is the method used. This is just the reverse of the process used to determine the shot times from the desired parameter values.

In this model the arm command is conveyed by a series of eight shots at predetermined times. In the example in Table 3 all eight shots occurred and were correctly identified. Thus the interpretation is shown to "ARM THE DETONATOR". Similarly a subsequent eight shots are used to convey the command to "DETONATE". In this example these eight shots were absent and properly identified as absent. Thus the interpretation is "DO NOT DETONATE".

Multiple shots are used to convey these vitally important messages to ensure that a potentially hazardous action is not taken unintentionally through an error in communication. Probability of an error can be reduced to an arbitrarily low level by increasing the number of shots used to convey the command. However this correspondingly increases the likelihood of an inability to signal the command due to noise interference. In this method any errors in communication are most likely to cause a safe outcome.

Repeated signaling of the same commands can be used to overcome a failure to communicate due to temporary noise interference. This is done by performing an identical SISS at a subsequent PTW. The signal processor can be programmed to combine the recordings using signal enhancement technology well known in the seismic industry or they may be simply processed independently and results compared.

In the example in Table 3 all shots were correctly timed and identified within the limits specified and therefore all of the information in the intended message was correctly conveyed. The process controller 630, having processed the seismic data, invoked the menu to decode the message, then processed the quality assurance information. The process controller then evaluates this and decides any actions to take. In this case it would command device actuator 640 to "ARM THE DETONATOR". It would also set the K Gain to 36 dB (in the seismic signal processor 620) and make ready to use Project Menu 1 for the next PTW. Thus the process controller 630 not only controls the actions of the controllable device, it also controls the operation of the entire seismic receiver/process controller system.

Continuing the specific examples of seismic communication using the project menu of Tables 1–2 (Table 3 was the first example), Table 4 shows a subsequent SISS. In Table 4 shots are taken to indicate to "DETONATE". A condition for this command to be valid is for the detonator to be armed so the shots which indicate to arm the detonator are also taken. This provides in effect 16 shots which have to be correctly identified as shots for the detonate command to take place. Thus it is extremely unlikely that a false detonate command could be interpreted, even in very poor signal-to-noise ratio conditions.

Again, as in the example of Table 3, the standard deviation of Delta to Model Times is sufficiently small (at 4.16 msec) and the observed correlation coefficients exceed the threshold of 0.7. The parity shot signals 19 shots, the same number as the number of shots identified. Thus the parity checks correctly and all of the quality assurance indicators signify a successful message transmission.

When the interpreted message and quality assurance information is passed by the signal processor to the process controller, the process controller would command the controllable device, i.e. perforation gun system, to detonate.

Depending on the design of the combined downhole equipment the resultant explosion could damage and render inoperative the process controller 640. This may be acceptable since it has fulfilled its mission.

The final example of application of the project menu of Tables 1–2 is shown in Table 5. In this example a failure of seismic communication is depicted.

As in the example of Table 4, it is desired to send the message to detonate. However in the new example, one of the seven shots was not correctly identified as a shot due to a high amplitude burst of ambient noise. The process controller 640 presumes the absence of the required shot because of the low value of the correlation coefficient, 0.412. It also notes that the parity value communicated differs by one from the number of shots it actually detected. It decides what, if any, action to take. In strict adherence to safety standards it does not issue a detonate command.

At the zone controller 160 a subsurface explosion is not detected (monitored via seismic receiver array 180) and a decision may be taken to continue sending the identical message at subsequent PTWs until an explosion occurs. Assuming better noise conditions, this will happen after the next SISS is received. This process controller can reject the communication entirely or it may invoke special logic with which it may be programmed to take an "intelligent" decision on what to do next. The process controller may, of course, listen at the next scheduled PTW for the next SISS, which may clarify the message.

If not, other recourse is to quiet the noise or increase the signal strength. If these measures and further such measures fail the ultimate recourse may be to use conventional means to cause a detonation of the mine. This type of failure is expected to be very rare due to the robustness of the seismic communication technology described herein.

The seismic receiver array 180 and zone controller 160 may serve multiple purposes in the preferred embodiment. It is required for monitoring the performance of the seismic source 140 so that the zone controller may ascertain that the seismic transmissions are in fact nearly identical for the series of shots (to the degree required for the seismic communication for the given project). Another purpose may be served with the same system which is to seismically monitor the defense zone 100 and determine location of significant events such as intrusions or detonation of attack devices 120.

Figures 14A, 14B:
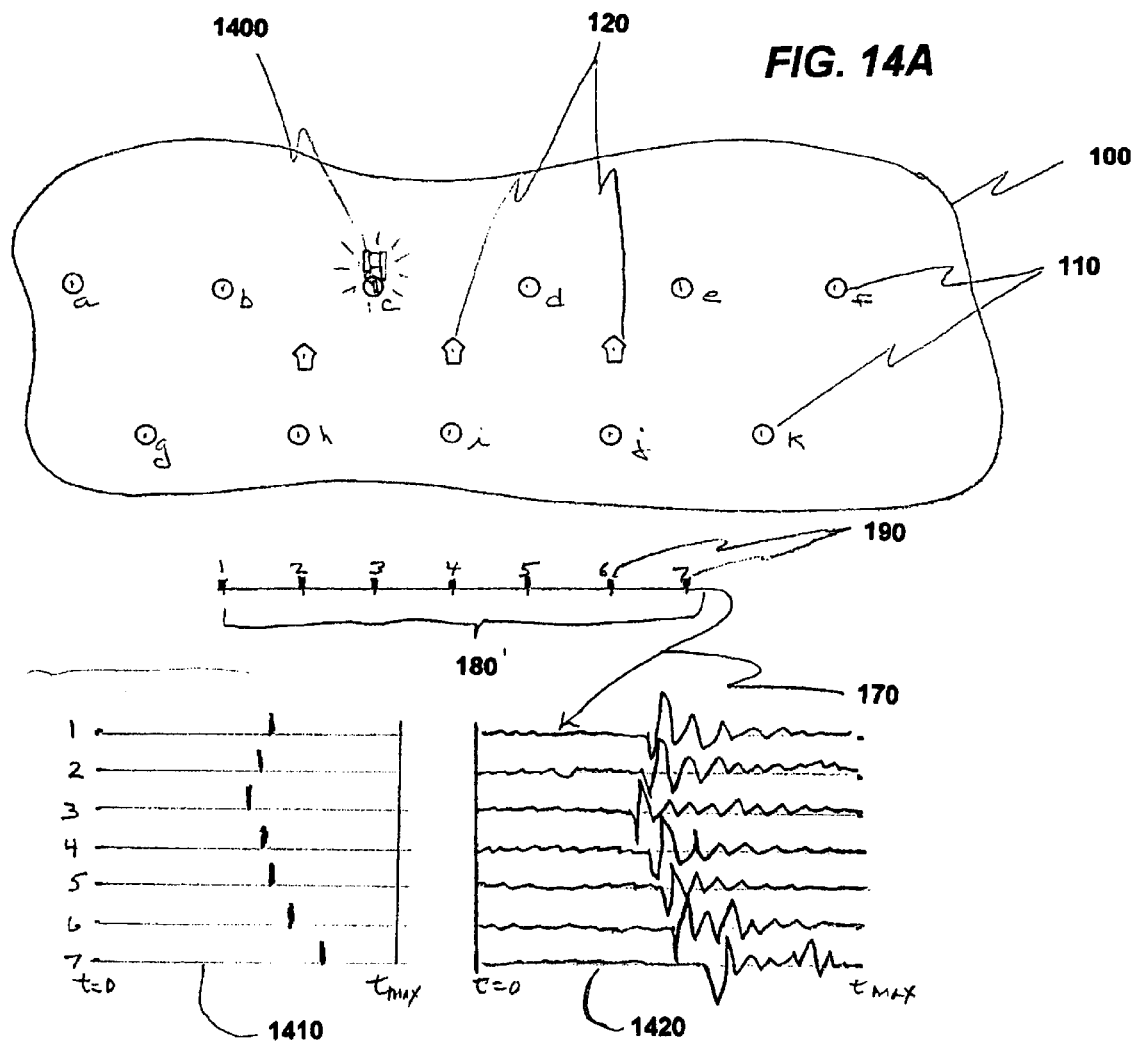
FIG. 14A shows a map view of a defense zone with mine C detonating and a comparison of predicted first arrival seismic energy from mine C to recorded first arrival energy.
FIG. 14B is a graph of the predicted first arrival time for seismic energy from the mine C detonation.

FIG. 14A shows an intruding vehicle 1400 within the defense zone. The movement of the vehicle, as it encroaches on the attack devices 110, is detected by monitoring the seismic waves it creates that impinge upon the seismic sensor units 190 within the seismic receiver array 180. This seismic energy is observable by the zone controller 160 which determines from it the approximate location of origin, using simple seismic travel time calculations based on the geometry of the seismic array 180 and estimated or measured seismic velocities, or an alternative method based on calibration recordings. An alert system may be programmed and running in the zone controller 160 which notifies the operator of the intrusion and its location and probable nature. The performance of the seismic system for intrusion detection is improved if the following method is used in conformance with the preferred embodiment.

At the time of deployment of the remote devices 110 and 120 the seismic source 140 may be moved from the fixed site to the vicinity of each selected device in turn. The source is activated at or very near each selected device site. The seismic waves from the source are detected by the seismic sensors 190 in the sensor array 180 and recorded. The zone controller 160 processes and retains the recordings. These calibration recordings provide a pattern of first arrival energy similar to that shown in FIG. 14B. The seismic first arrival predicted pattern 1410 is simply the set of seismic travel times from the selected device site to each seismic sensor unit 190 or combined sensor cluster within seismic receiver array 180. The recorded wave field appears similar to that shown at the right in FIG. 14B. When these patterns are cataloged and stored by the zone controller they are available for later comparison to observed and recorded seismic waves from disturbances within the defense zone 100. A near match in seismic first-arrival predicted pattern 1410 to the actual recorded first-arrival seismogram 1420 from the intruder is used to provide an accurate location of the intruder. Should an explosive device detonate, its location (and identity) can also be determined in this manner. FIG. 14A and 14B depict an exploding mine 1400 detonated by an intruding tank and shows the close agreement between the predicted (from prior calibration as described above) and the actual first arrivals. This method can be used for both land and marine defense zones.

More advanced pattern recognition methodology may alternatively be used to compare the recorded seismic wave fields of the supposed intruder to the cataloged calibration recordings.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A seismic system suitable to communicate information to a military device positioned within a surveillance zone, comprising:
    a seismic source to transmit information to said device by generation of a series of nearly identical seismic shots initiated from a fixed site, said shots having a distinctive amplitude profile ;
    a shot controller for directing said seismic source to generate said seismic shots within time windows selected from a series of programmed time windows, said controller directing a reference shot within a first selected time window;
    a seismic receiver in communication with a military device to receive and record said seismic shots; and
    a processor in communication with said seismic receiver, said processor having a capacity to compare the profiles of subsequent shots to the profile of said reference shot, to measure time differentials between initiation of said reference shot and initiation of a subsequent shot and to determine information from said time differentials.

2. The seismic system of claim 1, wherein individual shots of said series of nearly identical seismic shots are at intervals corresponding to said transmitted information and said processor is programmed to translate said transmitted information from said intervals.

3. The processor of claim 2, wherein said processor translates said transmitted information at intervals determined by a project menu that correlates said intervals to programmed device instructions.

4. The seismic system of claim 1, wherein said processor cross-correlates a first seismic shot with a second seismic shot to establish an initiation time for said second shot.

5. The seismic system of claim 4, wherein said first seismic shot is constructed by combining two or more seismic shots that occur earlier in time than said second seismic shot.

6. The seismic system of claim 1, wherein said processor employs a binary communication protocol so that a seismic shot inititated during a designated shot window following said first shot window communicates a first bit of datum to said processor, and the absence of a seismic shot during said designated shot window communicates a second bit of datum to said processor.

7. The seismic system of claim 1, wherein said processor includes a communication protocol such that information communicated to said processor depends on the magnitude of said time differential between initiationof said reference shot and initiation of a designated subsequent shot.

8. The seismic system of claim 1, wherein said processor further comprises a clock that is subject to clock drift.

9. The seismic system of claim 8, wherein a designated subsequent shot is initiated at a designated time subsequent to initiation of said reference shot, said processor accounting for said clock drift by computing a difference between the initiation time of said designated subsequent shot and a measured arrival time of said designated subsequent shot at said seismic receiver.

10. The seismic system of claim 1, wherein said system includes one or more geophones.

11. The seismic system of claim 1, wherein said system includes one or more hydrophones.

12. The seismic system of claim 1, further comprising an offensive device in association with said processor, said offensive device having one or more explosive charges subject to detonation.

13. The seismic system of claim 12, wherein said processor arms or detonates said explosive charges in response to said determined information.

14. The seismic system of claim 13, further comprising at least one seismic monitor independent of said device, wherein detonation of said explosive charges creates seismic detonation waves that may be detected by said sonic monitor.

15. The seismic system of claim 14, wherein a control processor determines the approximate location of detonated explosive charges from said seismic detonation waves detected by said seismic monitor.

16. The seismic system of claim 14, wherein said seismic detonation waves detected by said seismic monitor are analyzed to estimate first arrival times of said seismic waves.

17. The seismic system of claim 14, wherein said seismic source generates calibration shots for the production of calibration waves which are compared to seismic waves from other sources.

18. The seismic system of claim 1, wherein said seismic source includes a plurality of Vibroseis sources.

19. The seismic system of claim 1, wherein said seismic source includes a plurality of airgun sources.

20. The seismic system of claim 1, wherein said series of seismic shots include communication shots and command shots.

21. The seismic system of claim 1, wherein said seismic source is positioned on the surface of the earth.

22. The seismic system of claim 1, wherein said seismic source is positioned within a body of water.

23. The seismic system of claim 1 further comprises at least one seismic monitor, said seismic monitor having no connection with said processor.

24. The seismic system of claim 23, wherein said seismic monitor is responsive to potential intrusions into said surveillance zone.

25. The seismic system of claim 23, wherein said seismic monitor is used to determine the position of detonations within said defense zone.

26. The seismic system of claim 23, wherein said seismic monitor is calibrated by activating said seismic source at or near the location of said device.

27. A method for transmitting operational information to a military device in a defense zone, comprising the steps of:

(a) generating a first seismic signal at a first location, said seismic signal being a reference signal;

(b) receiving said first seismic signal at said device in said defense zone;

(c) generating a second seismic signal from said first location at a selected time after said first seismic signal;

(d) receiving said second seismic signal at said device in said defense zone;

(e) confirming the identity of said second signal by comparing second signal characteristics to characteristics of said first signal; and, (f) determining information from the interval between said first and second seismic signals for operating said device.

28. The method of claim 27, further comprising the step of transmitting a plurality of seismic signals after said second seismic signals, wherein said information is an instruction based on said first, said second, and said plurality of seismic signals.

29. The method of claim 27, further comprising the step of correcting for the drift of a clock associated with said device based on said information.

30. The method of claim 27, wherein said device is an explosive device.

31. The method of claim 27, wherein said device not an explosive device.

32. The method of claim 27, further comprising the steps of selectively disarming or arming said device based on said information.

33. The method of claim 30, wherein said information forms at least a portion of a detonate command for said explosive device.

34. The method of claim 27, further comprising the step of listening for seismic signals from said device.

35. The method of claim 34, wherein said device is an explosive device and wherein said information forms at least a portion of a detonate command for said explosive device.

36. The method of claim 27, wherein said confirming step includes the cross-correlation of said first seismic signal and said second seismic signal.

37. A method to interpret a seismic signal comprising:

(a) receiving a first seismic signal at location in a defense zone;

(b) waiting a predetermined delay based on a clock at said location;

(c) listening for the presence of a second seismic signal at about said predetermined delay;

(d) determining information from said listening step.

38. The method of claim 37, wherein said determination of information yields the value of a data bit.

39. The method of claim 37, wherein said information is a string of data bits that correspond to an instruction according to a predetermined correlation.

40. The method of claim 39, wherein said instruction is a detonate command for transmission to an explosive device in a defense zone.

41. The method of claim 37, wherein said first seismic signal is received by a non-explosive device in a defense zone.

42. The method of claim 37, wherein said information is a coded command that is interpreted by reference to a project menu stored in an electronic memory element.

43. The method of claim 37, further comprising the step of accounting for a time drift in the clock at said location based upon a timed difference between a measured delay of said second seismic signal and said predetermined delay.

44. The method of claim 37, further comprising the step of cross-correlating a detected seismic signal at a time proximate said predetermined delay and said first seismic signal.

45. The method of claim 37, wherein said first seismic signal is generated at a fixed location.

46. The method of claim 37, wherein said second seismic signal must arrive in a temporal window defined by said predetermined delay and a maximum calculated clock drift of an associated clock at said location.

* * * * *